United States Patent
Zhao et al.

(10) Patent No.: US 11,323,717 B2
(45) Date of Patent: May 3, 2022

(54) FREQUENCY ADJUSTMENT FOR TEXTURE SYNTHESIS IN VIDEO CODING

(71) Applicant: HUAWEI TECHNOLOGIES CO., LTD., Shenzhen (CN)

(72) Inventors: Zhijie Zhao, Munich (DE); Bastian Wandt, Hannover (DE); Yiqun Liu, Hannover (DE); Thorsten Laude, Hannover (DE); Bodo Rosenhahn, Ronnenberg (DE); Joern Ostermann, Hannover (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 16/895,653

(22) Filed: Jun. 8, 2020

(65) Prior Publication Data

US 2020/0336745 A1 Oct. 22, 2020

Related U.S. Application Data

(63) Continuation of application No. PCT/EP2017/082071, filed on Dec. 8, 2017.

(51) Int. Cl.
*H04N 19/132* (2014.01)
*H04N 19/137* (2014.01)
(Continued)

(52) U.S. Cl.
CPC ......... *H04N 19/132* (2014.11); *H04N 19/137* (2014.11); *H04N 19/176* (2014.11); *H04N 19/186* (2014.11); *H04N 19/625* (2014.11)

(58) Field of Classification Search
CPC .. H04N 19/132; H04N 19/137; H04N 19/176; H04N 19/186; H04N 19/625;
(Continued)

(56) References Cited

U.S. PATENT DOCUMENTS 6,919,903 B2 7/2005 Freeman et al.
8,204,325 B2 6/2012 Segall et al.
(Continued)

FOREIGN PATENT DOCUMENTS

WO 2008042127 A2 4/2008
WO 2011157593 A1 12/2011

OTHER PUBLICATIONS

Budagavi et al., "Video Compression using Blur Compensation," ICIP 2005, XP010851195, pp. 1-4, Institute of Electrical and Electronics Engineers, New York, New York (Sep. 2005).
(Continued)

*Primary Examiner* — Susan E. Hodges
(74) *Attorney, Agent, or Firm* — Leydig, Voit & Mayer, Ltd.

(57) ABSTRACT

The present disclosure relates to encoding and decoding video by employing texture coding. In particular, a texture region is identified within a video picture and a texture patch is determined for the texture region. Moreover, a first set of parameters is derived specifying weighting factors for reconstructing spectral coefficients of the texture region by fitting the texture region in a spectral domain to a first function of the texture patch, the first function being defined by the first set of parameters. The texture patch and the first set of parameters are then included into a bitstream which is output by an encoder and provided in this way to the decoder which reconstructs the texture based on the patch and the function applied to the patch.

15 Claims, 14 Drawing Sheets

(51) Int. Cl.
*H04N 19/176* (2014.01)
*H04N 19/186* (2014.01)
*H04N 19/625* (2014.01)

(58) Field of Classification Search
CPC ...... H04N 19/85; H04N 19/48; H04N 19/103; H04N 19/136; H04N 19/17; H04N 19/619; H04N 19/90
USPC .......................................................... 375/240
See application file for complete search history.

(56) References Cited

U.S. PATENT DOCUMENTS

| | | | |
|---|---|---|---|
| 8,249,365 B1* | 8/2012 | Winnemoeller | G06F 3/0484 382/219 |
| 8,724,915 B2 | 5/2014 | Min et al. | |
| 2003/0076334 A1 | 4/2003 | Dumitras et al. | |
| 2003/0164838 A1* | 9/2003 | Guo | G06T 11/001 345/582 |
| 2006/0017739 A1* | 1/2006 | Fang | G06T 15/04 345/582 |
| 2009/0185747 A1* | 7/2009 | Segall | H04N 19/27 382/220 |
| 2011/0091120 A1* | 4/2011 | Yin | H04N 19/593 382/233 |
| 2013/0208807 A1* | 8/2013 | Thoreau | H04N 19/20 375/240.25 |

OTHER PUBLICATIONS

F. Racape et al., "Spatiotemporal texture synthesis and region-based motion compensation for video compression," Signal Processing: Image Communication vol. 28, No. 9, XP028723637, pp. 993-1005, Elsevier B.V. (2013).
Vatis et al., "Adaptive Interpolation Filter for H.264/AVC," IEEE Transactions on Circuits and Systems for Video Technology, vol. 19, No. 2, XP011280566, pp. 179-192, Institute of Electrical and Electronics Engineers, New York, New York (Feb. 2009).
Taegeun Oh et al., "Blind Sharpness Prediction Based on Image-Based Motion Blur Analysis," IEEE Transactions on Broadcasting, vol. 61, No. 1, XP011574115, pp. 1-15, Institute of Electrical and Electronics Engineers, New York, New York (Mar. 2015).
Patel et al., "Edges based Intra-prediction in High Efficiency Video Coding (HEVC) standard," 2nd IEEE International Conference on Engineering and Technology (ICETECH), XP032962313, pp. 1-6, Institute of Electrical and Electronics Engineers, New York, New York (Mar. 17-18, 2016).
Tanizawa et al., "Redundancy removal of explicit weighted prediction syntax," Joint Collaborative Team on Video Coding (JCT-VC) of ITU-T SG16 WP3 and ISO/IEC JTC1/SC29/WG11, 7th Meeting: Geneva, CH, JCTVC-G441, XP030110425, pp. 1-6 (Nov. 21-30, 2011).
Chen et al., "Algorithm Description of Joint Exploration Test Model 7 (JEM7)," Joint Video Exploration Team (JVET) of ITU-T SG 16 WP 3 and ISO/IEC JTC 1/SC 29/WG 11, 7th Meeting: Torino, IT, No. JVET-G1001-v1, XP030150980, total 51 pages (Jul. 13-21, 2017).
Wandt et al., "Extending HEVC with a Texture Synthesis Framework using Detail-aware Image Decomposition," 2018 Picture Coding Symposium (PCS), XP033398573, pp. 144-148, Institute of Electrical and Electronics Engineers, New York, New York (Jun. 2018).
Wandt et al., "Extending HEVC Using Texture Synthesis," 2017 IEEE Visual Communications and Image Processing (VCIP), XP033325714, pp. 1-4, Institute of Electrical and Electronics Engineers, New York, New York (Dec. 10-13, 2017).
Dumitras et al.,"An Encoder-Decoder Texture Replacement Method With Application to Content-Based Movie Coding," IEEE Transactions on Circuits and Systems for Video Technology, vol. 14, No. 6, XP001196870, pp. 825-840, Institute of Electrical and Electronics Engineers, New York, New York (Jun. 2004).
Yacov Hel-Or et al., "Synthesis and Rendering of 3D Textures," pp. 1-5 (2003).
Ndjiki-Nya et al., "Video Coding Using Texture Analysis and Synthesis" in PCS, pp. 1-6 (2003).
Efros et al.,"Image Quilting for Texture Synthesis and Transfer," ACM SIGGRAPH 2001, pp. 341-346 (Aug. 2001).
H.W. Kuhn, "The hungarian method for the assignment problem," Naval Res. Logist. Quart, pp. 83-97 (1955).
Kwatra et al., "Graphcut Textures: Image and Video Synthesis Using Graph Cuts," vol. 22, No. 3, ACM Transactions on Graphics, SIGGRAPH 2003, pp. 277-286 (Jul. 2003).
Dijkstra, "A note on Two Problems in Connexion with Graphs," In: Numerische Mathematik 1, pp. 269-271 (1959).
Sun et al., "Secrets of Optical Flow Estimation and Their Principles," in IEEE Conf. on Computer Vision and Pattern Recognition (CVPR), pp. 2432-2439, Institute of Electrical and Electronics Engineers, New York, New York (Jun. 2010).
Dumitras et al., "A Texture Replacement Method at the Encoder for Bit-Rate Reduction of Compressed Video," IEEE Transactions on Circuits and Systems for Video Technology, vol. 13, No. 2, pp. 163-175, Institute of Electrical and Electronics Engineers, New York, New York (Feb. 2003).
Thakur et al., "Dynamic Texture Synthesis using Linear Phase Shift Interpolation," total 5 pages, Institute of Electrical and Electronics Engineers, New York, New York (2016).
MacQueen, "Some Methods for Classification and Analysis of Multivariate Observations," Proceedings of 5th Berkeley Symposium on Mathematical Statistics and Probability, vol. 1, pp. 281-297, University of California Press, Berkeley, California, USA (1967).
Lloyd, "Least Squares Quantization in PCM," IEEE Transactions on Information Theory, vol. IT-28, No. 2, pp. 129-137, Institute of Electrical and Electronics Engineers, New York, New York (Mar. 1982).
Sun et al., "A Quantitative Analysis of Current Practices in Optical Flow Estimation and the Principles Behind Them," International Journal of Computer Vision 106, pp. 115-137 (2014).
Deutsch et al., "Deflate Compressed Data Format Specification version 1.3," Request for Comments: 1951, pp. 1-15 (May 1996).

\* cited by examiner

FREQUENCY ADJUSTMENT FOR TEXTURE SYNTHESIS IN VIDEO CODING

CROSS-REFERENCE TO RELATED APPLICATIONS

This application is a continuation of International Application No. PCT/EP2017/082071, filed on Dec. 8, 2017, the disclosure of which is hereby incorporated by reference in its entirety.

TECHNICAL FIELD

Embodiments of the present invention relate to image and/or video coding and decoding employing texture synthesis.

BACKGROUND

Current hybrid video codecs, such as H.264/AVC or H.265/HEVC, employ compression including predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed by means of quantization and further compacted by entropy coding to form a bitstream. The bitstream further includes any signaling information which enables the decoding of the encoded video. For instance, the signaling may include settings concerning the encoding such as size of the input picture, frame rate, quantization step indication, prediction applied to the blocks of the pictures, or the like. The coded signaling information and the coded signal are ordered within the bitstream in a manner known to both the encoder and the decoder. This enables the decoder parsing the coded signaling information and the coded signal.

Depending on the selected configuration, High Efficiency Video Coding (HEVC) achieves a 40-60% bit rate reduction over the predecessor standard Advanced Video Coding (AVC) while maintaining the same visual quality. Although the overall coding efficiency is superior, analyses reveal that HEVC performs differently well for varying signal characteristics. The predictability of the currently coded block based on previously coded blocks is of crucial importance for a high coding efficiency because the resulting prediction error accounts for a major part of the overall bit rate. While signal parts with low complexity textures or foreground objects with distinct borders can be efficiently coded, this is not possible for signal parts with high-complexity and irregular textures. These textures are hardly predictable, neither by intra prediction nor by motion compensation.

The described limitation of HEVC can be traced back to the premise of the encoding system that a high pixel-wise fidelity of the reconstructed video is a suitable indicator for a well-encoded video. However, considering the properties of the human visual system and that the viewer never saw the originally encoded video, a high pixel-wise fidelity is not imperative. Texture synthesis may be an adequate mean to cope with the low efficiency of conventional coding methods for these complex textures. Instead of aiming at pixel-wise fidelity, texture synthesis algorithms target a compelling subjective quality of the reconstructed video.

SUMMARY

In view of the above mentioned background art, an aim of the present disclosure is to provide an efficient encoding and/or decoding mechanism for video signal based on texture synthesis.

In particular, in order to improve the texture synthesis, frequency adjustment is performed for the synthesized texture blocks. The frequency adjustment is performed by applying to the patch texture in spectral domain a frequency damping function.

According to an aspect, an apparatus is provided for encoding a video picture employing a texture synthesis. The apparatus comprises a processing circuitry which is configured to: identify a texture region within a video picture and a texture patch for said region, the region including a plurality of picture samples; determine a first set of parameters specifying weighting factors for reconstructing spectral coefficients of the texture region by fitting the texture region in a spectral domain to a first function of the texture patch, the first function being determined according to the first set of parameters; and code the texture patch and the first set of parameters into a bitstream.

Such frequency damping provides the possibility of adapting the reconstructed one or more blocks (region) to the original, by adjusting the spectrum of the patch.

In one embodiment, the processing circuitry is configured to: transform one or more blocks of the texture region into the spectral domain; transform the texture patch into the spectral domain; find for the transformed one or more blocks respective frequency damping parameters by approximating each transformed block with the transformed texture patch damped with the respective damping parameter; and code the first set of parameters by fitting the frequency damping parameters determined for the respective blocks to a block map function.

Such coding may substantially reduce the additional overhead caused by the signaling of the first parameter set as the damping parameters may vary per block, but only parameters of the function approximating the damping parameters of all blocks are to be transmitted.

For example, the damping parameter is a scalar value. This further reduces the overhead.

The first function is, for instance, a first two-dimensional polynomial. A two dimensional polynomial provides a very efficient way of signaling with a sufficient variability to adapt the damping parameters. The order of the polynomial may be also signaled. In one example, the first two-dimensional polynomial has order one or two in each of the two dimensions, the two dimensions being vertical and horizontal.

The transformation for transforming the texture region into spectral domain may be a block-wise discrete cosine transformation.

In one embodiment, combinable with any of the above embodiments and examples, the processing circuitry is further configured to: determine a second set of parameters specifying luminance within the texture region by fitting the texture region samples to a second two-dimensional function defined by the second set of parameters, and code the second set of parameters into the bitstream. Additional adjustment of illumination enables more precise synthesis of the texture regions corresponding to typical illumination situation of real video sequences.

For example, the second function is a two-dimensional polynomial. The two-dimensional polynomial may have order one or two in each of the two dimensions.

The processing circuitry is further configured to: estimate motion for the texture region; generate motion information according to the estimated motion; and code the motion information into the bitstream. Adaptation to motion is another means for making the synthesized regions closer to the captured video images, which typically include smooth motions able to be modeled well by means of a set of parameters.

According to an embodiment, the estimation of motion is performed by calculating an optical flow between the texture region in a first video picture and the texture region in a second video picture preceding the first video picture. The motion information is a third set of parameters which is determined by fitting the optical flow to a two-dimensional polynomial of a first order or a second order.

The calculation of the optical flow may be performed by a function which penalizes higher distances between the components of the optical flow and/or higher differences between the corresponding samples of the first and the second video picture. This is to reflect the typical optical flow characteristics in natural video sequences.

According to another embodiment, combinable with any of the above embodiments, the processing circuitry is further configured to apply a suppression of block artifacts between blocks of the texture region and blocks of a remaining region, the suppression being performed by: (i) calculating a distance matrix between luminance values of an overlapped block of the texture region and a block of the remaining region, (ii) calculating the shortest path in the distance matrix, and (iii) combining the block of the texture region and the block of the remaining region along the calculated shortest path.

The processing circuitry may be further configured to: detect the texture region within a video picture by using clustering; generate texture region information indicating the location of the texture region within the video picture; and insert the texture region information into the bitstream.

According to an aspect, an apparatus is provided for decoding a video picture employing a texture synthesis, the apparatus comprising a processing circuitry configured to: decode from the bitstream a texture patch and a first set of parameters; reconstruct a texture region within a video picture from the texture patch, the region including a plurality of picture samples, the reconstruction including weighting spectral coefficients of the patch with a function determined by the first set of parameters.

In one embodiment, the processing circuitry is configured to: determine damping parameters for the respective blocks of the texture region according to a block map function determined according to the first set of parameters; reconstruct the blocks including applying the respective damping parameters to the texture patch in spectral domain; and transform the reconstructed blocks from the spectral domain to a spatial domain.

The damping parameter may be a scalar value. The first function may be first two-dimensional polynomial. For example, the first two-dimensional polynomial has order one or two in each of the two dimensions, the two dimensions being vertical and horizontal.

The transformation for transforming the texture region into spectral domain may be a block-wise discrete cosine transformation.

According to an embodiment, the processing circuitry is further configured to decode a second set of parameters from the bitstream, wherein the reconstruction further includes calculating a function of the texture patch luminance (illumination), the function being defined by the parameters of the second set.

The second function is, for instance, a two-dimensional polynomial. The two-dimensional polynomial may have order one or two in each of the two dimensions.

The processing circuitry is further configured to: parse (decode) the bitstream motion information; based on the motion information, determine a motion compensation function; and apply the motion compensation function to the synthesized texture portion.

It is noted that the determination of the motion compensation may be performed by means of a parametrized function of which the parameters are signaled in the bitstream within the third set of parameters.

For example, the determination of the motion compensation function may be, for instance a two-dimensional polynomial of a first order or a second order for approximating an optical flow between the texture region in a first video picture and the texture region in a second video picture preceding the first video picture.

The motion information is the third set of parameters and indicates (for instance directly codes) the parameters of the motion compensation function such as polynomial parameters and possibly also order. However, the order may be alternatively predefined, for instance, by the standard. It is noted that the motion compensation is then applied to the texture to be synthesized.

According to an embodiment, the processing circuitry is further configured to apply a suppression of block artifacts between blocks of the texture region and blocks of a remaining region, the suppression being performed by: (i) calculating a distance matrix between luminance values of an overlapped block of the texture region and a block of the remaining region, (ii) calculating the shortest path in the distance matrix, (iii) combining the block of the texture region and the block of the remaining region along the calculated shortest path.

According to an embodiment, the processing circuitry is further configured to parse from the bitstream texture region information indicating the location of the texture region within the video picture. The texture region information may be, for instance, a bitmap indicating for each block of picture whether it belongs either to synthesizable (texture) region or to the remaining portion of the picture (non-synthesizable region). This information may be further used for determining which parts of the remaining picture region and the synthesized texture are to be combined. Also, the above described reconstruction processing is only necessary for the texture region so that in order to reduce the complexity on the decoder, only these portions may be processed by adjusting the texture by motion compensation and/or luminance compensation and/or frequency damping.

According to an aspect, a method is provided for encoding a video picture employing a texture synthesis, the method comprising the steps of: identifying a texture region within a video picture and a texture patch for said region, the region including a plurality of picture samples; determining a first set of parameters specifying weighting factors for reconstructing spectral coefficients of the texture region by fitting the texture region in spectral domain to a first function of the texture patch, the first function being determined by the first set of parameters; and coding the texture patch and the first set of parameters into a bitstream.

In one embodiment, the method further comprises transformation of one or more blocks of the texture region into the spectral domain; transformation of the texture patch into the spectral domain; calculation, for the transformed one or more blocks, of respective frequency damping parameters by approximating each transformed block with the transformed texture patch damped with the respective damping parameter; and coding the first set of parameters by fitting the frequency damping parameters determined for the respective blocks to a block map function. For example, the damping parameter is a scalar value.

The first function is, for instance, a first two-dimensional polynomial. The order of the polynomial may be also signaled in one exemplary embodiment. In one example, the first two-dimensional polynomial has order one or two in each of the two dimensions, the two dimensions being vertical and horizontal.

The transformation for transforming the texture region into the spectral domain may be a block-wise discrete cosine transformation.

In one embodiment, combinable with any of the above embodiments and examples, the method further comprises the steps of: determining a second set of parameters specifying luminance within the texture region by fitting the texture region samples to a second two-dimensional function defined by the second set of parameters, and coding the second set of parameters into the bitstream.

For example, the second function is a two-dimensional polynomial. The two-dimensional polynomial may have order one or two in each of the two dimensions.

The method may further include the estimating of motion for the texture region; generating motion information according to the estimated motion; and coding the motion information into the bitstream. According to an embodiment, the estimation of motion is performed by calculating an optical flow between the texture region in a first video picture and the texture region in a second video picture preceding the first video picture. The motion information is a third set of parameters which is determined by fitting the optical flow to a two-dimensional polynomial of a first order or a second order.

The calculation of the optical flow may be performed by a function which penalizes higher distances between the components of the optical flow and/or higher differences between the corresponding samples of the first and the second video picture.

According to another embodiment, combinable with any of the above embodiments, the method further comprises the steps of applying a suppression of block artifacts between blocks of the texture region and blocks of a remaining region, the suppression being performed by: (i) calculating a distance matrix between luminance values of an overlapped block of the texture region and a block of the remaining region, (ii) calculating the shortest path in the distance matrix, and (iii) combining the block of the texture region and the block of the remaining region along the calculated shortest path.

The method may further include detecting the texture region within a video picture by using clustering; generating texture region information indicating the location of the texture region within the video picture; and inserting the texture region information into the bitstream.

According to another aspect, a method is provided for decoding a video picture employing a texture synthesis, the method comprising the steps of: decoding from the bitstream a texture patch and a first set of parameters; reconstructing a texture region within a video picture from the texture patch, the region including a plurality of picture samples, the reconstruction including weighting spectral coefficients of the patch with a function determined by the first set of parameters.

In one embodiment, the method further comprises the steps of determining damping parameters for the respective blocks of the texture region according to a block map function determined according to the first set of parameters; reconstructing the blocks including applying the respective damping parameters to the texture patch in spectral domain; and transforming the reconstructed blocks from the spectral domain to spatial domain.

The damping parameter may be a scalar value. The first function may be first two-dimensional polynomial. For example, the first two-dimensional polynomial has order one or two in each of the two dimensions, the two dimensions being vertical and horizontal.

The transformation for transforming the texture region into spectral domain may be a block-wise discrete cosine transformation. According to an embodiment, the method further comprises: decoding a second set of parameters from the bitstream, wherein the reconstruction further includes calculating a function of the texture patch luminance (illumination) and the function being defined by the parameters of the second set.

The second function is, for instance, a two-dimensional polynomial (vertical and horizontal direction). The two-dimensional polynomial may have order one or two in each of the two dimensions.

The method may further include parsing (decode) the bitstream motion information; based on the motion information, determining a motion compensation function; and applying the motion compensation function to the synthesized texture portion. For example, the determination of the motion compensation function may be, for instance a two-dimensional polynomial of a first order or a second order for approximating an optical flow between the texture region in a first video picture and the texture region in a second video picture preceding the first video picture.

The motion information is the third set of parameters and indicates (for instance directly codes) the parameters of the motion compensation function such as polynomial parameters and possibly also order. However, the order may be alternatively predefined, for instance by the standard. It is noted that the motion compensation is then applied to the texture to be synthesized.

According to an embodiment, the method further includes applying a suppression of block artifacts between blocks of the texture region and blocks of a remaining region, the suppression being performed by: (i) calculating a distance matrix between luminance values of an overlapped block of the texture region and a block of the remaining region, (ii) calculating the shortest path in the distance matrix, (iii) combining the block of the texture region and the block of the remaining region along the calculated shortest path.

According to an embodiment, the method also includes parsing, from the bitstream texture region, information indicating the location of the texture region within the video picture. The texture region information may be for instance, a bitmap indicating for each block of a picture whether it belongs either to a synthesizable (texture) region or to the remaining portion of the picture (non-synthesizable region). This information may be further used for determining which parts of the remaining picture region and the synthesized texture are to be combined. Also, the above described reconstruction processing is only necessary for the texture region so that in order to reduce the complexity on the decoder, only these portions may be processed by adjusting the texture by motion compensation and/or luminance compensation and/or frequency damping.

According to an aspect of the invention, a non-transitory computer-readable storage medium is provided storing instructions which when executed by a processor/processing circuitry perform the steps according to any of the above aspects or embodiments or their combinations.

BRIEF DESCRIPTION OF DRAWINGS

In the following, exemplary embodiments are described in more detail with reference to the attached figures and drawings, in which.

DETAILED DESCRIPTION OF EMBODIMENTS

Figure 1:
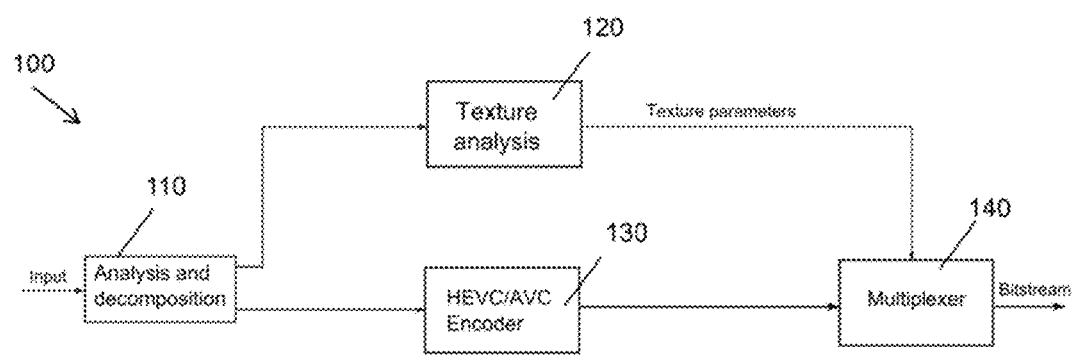
FIG. 1 is a block diagram illustrating an encoder supporting both texture coding and hybrid coding.

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Some early work on using texture synthesis for video coding is presented in P. Ndjiki-Nya, B. Makai, A. Smolic, H. Schwarz and T. Wiegand, "*Video coding using Texture Analysis and synthesis*" *in PCS,* 2003. They proposed a texture analyzer and synthesizer for video coding. At the encoder side textures are semi-automatically classified into regions with relevant and irrelevant subjective details. The texture classifier generates coarse masks and side information for the regions with irrelevant subjective details. This side information is transmitted to the decoder. At the decoder the texture is reconstructed from the side information. The algorithm is integrated into H.264/AVC. The approach is restricted to pure camera rotation and zoom. Additionally, the texture analyzing step requires manual input.

The work presented in A. Dumitras and B. G. Haskell, "*An encoder-decoder texture replacement method with application to content-based movie coding,*" *IEEE Trans. Circuits Syst. Video Techn.,* vol. 14, no. 6, pp. 825-840, 2004 proposes a content based coding method for texture replacement. At the encoder, texture is removed from selected regions of the original picture. Statistical parameters for the removed texture are extracted and transmitted. The picture with the removed texture is then encoded. At the decoder texture is synthesized from texture parameters from a statistical model. However, only frontal parallel framing with no or very low motion is considered. Therefore, applicability on realistic scenes is limited.

One recent work has been presented in F. Racape, O. Deforges, M. Babel, and D. Thoreau, "*Spatiotemporal texture synthesis and region-based motion compensation for video compression.*" *Sig. Proc.: Image Comm.,* vol. 28, no. 9, pp. 993-1005, 2013. They introduce a texture analysis/synthesis framework, which enables the use of multiple algorithms, depending on texture characteristics. At the encoder texture is removed from selected regions of the original picture. Statistical parameters for the removed texture are extracted and transmitted. The picture with the removed texture is then encoded. At the decoder texture is synthesized from texture parameters from a statistical model. However, only frontal parallel framing with no or very low motion is considered. Therefore, applicability on realistic scenes is limited.

When reviewing the prior art, some disadvantages have been discovered by the Inventors. The above mentioned works achieve some plausible results for video sequences presented by their authors. However, these are mostly simple sequences not including several challenging events, for instance lighting and frequency changes of textures. The above mentioned paper by Ndjiki-Nya et al. considered motion of textures during the scene and defined a simple motion model. However, they do not consider more complex camera motions like tilting and zooming, either. Reconstructing lighting changes was tried by some authors. They use information of neighboring pixels to reconstruct synthesizable regions. This allows for a plausible luminance reconstruction at the edges but cannot reconstruct lighting gradients reasonably well. Therefore, it is not well suited for larger areas.

The present disclosure provides an approach for reconstructing the texture, motion, luminance gradients and frequency components by using a relatively small set of variables.

As mentioned in the background section, texture synthesis is an adequate procedure to cope with the low efficiency of conventional coding methods for these complex textures. Instead of aiming at pixel-wise fidelity, texture synthesis algorithms target a compelling subjective quality of the reconstructed video.

For this reason, the encoded video is segmented into synthesizable and non-synthesizable regions. Subsequently, texture synthesis is used to reconstruct the synthesizable regions. The remaining parts of the signal are encoded conventionally. Thereby, the bit rate costs for the synthesizable regions may be substantially reduced and, in addition, these regions may be reconstructed with a high subjective quality. Furthermore, the released bit rate resources can be reallocated to the conventionally encoded signal. Hence, the quality of these signal parts can be increased while maintaining the same overall bit rate.

The corresponding encoder 100 is illustrated in FIG. 1. FIG. 1 shows an input image entering analysis and decomposition unit 110. The input image may be an image of a video sequence. However, it is noted that in general, the present disclosure is also applicable for still images. In the analysis and decomposition unit 110, the image is analyzed and segmented into synthesizable regions and non-synthesizable regions. For instance, the image is subdivided into blocks of the same or variable size and for each block, a decision is made on whether the block belongs to a synthesizable region or a non-synthesizable region. The synthesizable regions are provided to the texture analysis unit 120 in which these regions are parametrized. For instance, each block is described by means of a set of parameters necessary for their reconstruction. There texture parameters are binarized and output from the texture analysis unit 120 to a multiplexer 140, which inserts them into the bitstream. The insertion into the bitstream obeys a predefined bitstream syntax and semantics known to both the encoder and the decoder so that a decoder is capable to parse the bitstream into the syntax elements again and give them appropriate meaning according to the semantics.

The non-synthesizable regions are input to the HEVC/advanced video coding (AVC) encoder 130 for conventional image or video coding. It is noted that the HEVC/AVC encoder is only an example of a conventional encoder. In general, any image or video encoder can be employed lossy or lossless. The HEVC/AVC encoder 130 generates itself portions of the bitstream which are multiplexed with the portions of the bitstream generated by the texture analysis unit 120. It is noted that, in general, two separate bitstreams may be generated so that the multiplexing does not have to take place.

Figure 2:
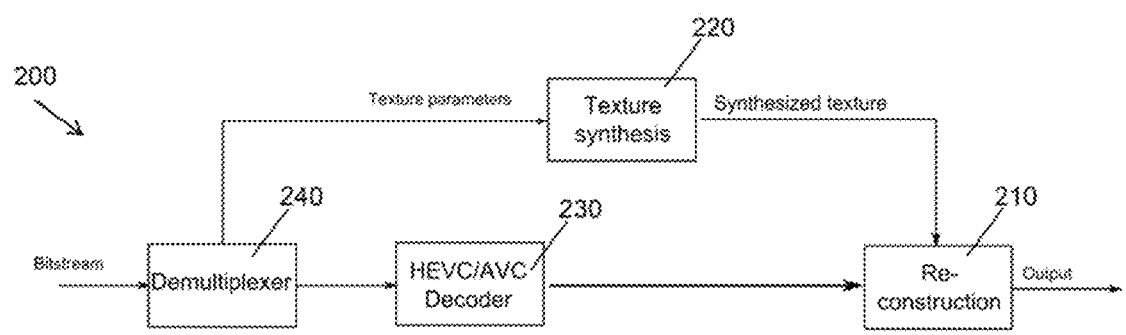
FIG. 2 is a block diagram illustrating a decoder supporting both texture decoding and hybrid decoding.

Correspondingly, FIG. 2 shows an exemplary decoder 200 which is capable of decoding the bitstream generated by the encoder of FIG. 1. The bitstream including both parts—coded by means of HEVC/AVC encoder 130 and by the texture analysis unit 120—is input to the demultiplexer 240. The demultiplexer divides the bitstream into the texture parameter portion which is input to a texture synthesis unit 220 and into the HEVC/AVC portion which is input to the HEVC/AVC decoder 230. The texture synthesis unit 220 uses the texture parameters to synthesize the texture and outputs the synthesized texture regions to a reconstruction unit 210 which combines the synthesized regions with regions decoded with a conventional decoder 230. Correspondingly, the HEVC/AVC decoder 230 (the conventional decoder) decodes the portion of the bitstream input from the demultiplexer 240 and provides the decoded regions to the reconstruction unit 210. The reconstruction unit combines both regions types synthesized regions and conventionally decoded regions to form output image.

In this document, the term image refers to a digital image which is a two-dimensional matrix including samples of pixel brightness values of one or more component colors. For instance, an image may be a greyscale image including N×M samples, each of the samples having a value ranging from 0 to 255 grey levels (corresponding to 8 bits per value) or 0 to 1023 gray levels (corresponding to 10 bits per value) or a different range (corresponding to more or less bits per value, or corresponding to definition in a standard such as the International Telecommunication Union-Radiocommunication (ITU-R) BT.2020). Alternatively, an image may be a color image including samples of three color components such as red, green, blue colors, each sample of each color may take a value ranging from 0 to 255 levels. However, embodiments of the present invention are not limited to any particular color space and in general any color space such as YUV, YCbCr, or the like, possibly using subsampling of color components (in spatial domain for instance by only taking every second pixel) may be used, as is known to those skilled in the art. In addition, instead of the aforementioned 8 bit grey level or color depth, other grey level or color depth quantizations may be used, e.g. a 10 bit quantization or any other higher or lower bit number quantization. The term "image" here is used as synonym mostly with the term "picture". The term "frame" refers to an image or a picture which is a part of a video sequence, i.e. a video frame, used synonymously with "video picture".

The term "video" here refers to a sequence of images capturing a scene or a plurality of scenes. This term is used synonymously mostly with the term "motion picture". Typically, the frames of the video are captured by a camera with other predefined temporal resolution of for instance 25, 30, 60 or the like frames per second. However, the present disclosure is not limited to natural video sequences. Alternatively, a video may be generated by computer graphics and/or animation.

The term "pixel" means one or more samples defining the brightness and/or color. Accordingly, a pixel may consist of a single sample defining for instance luminance. However, a pixel may also include samples corresponding to different colors such as red, green, blue or a luminance and respective chrominances, depending on the color space employed.

Simply replacing a synthesizable region by a synthesized texture results in three major issues:
1) The synthesized texture for subsequent frames needs to be consistent, i.e. camera motion has to be compensated.
2) Luminance information, perspective effects, and blurring may be lost when reconstructing the texture from a single small patch.
3) Block artifacts between synthesized and non-synthesized regions may result in poor subjective quality of the reconstructed video.

Some of the above mentioned issues are solved by the texture synthesis solution of the present disclosure. In particular, the present disclosure provides a possibility of frequency damping, e.g. by higher-order polynomial fitting, which may compensate for perspective effects and motion blur. This addresses especially the above mentioned issue 2).

In addition, or in alternative embodiments, motion compensation, e.g. by using hyperplane fitting, may be applied. Another beneficial tool may be luminance reconstruction employing polynomial fitting and/or a deblocking method to reduce block artifacts between synthesized and non-synthesized regions by applying a mincut algorithm to neighboring block at the region borders.

Figure 3:
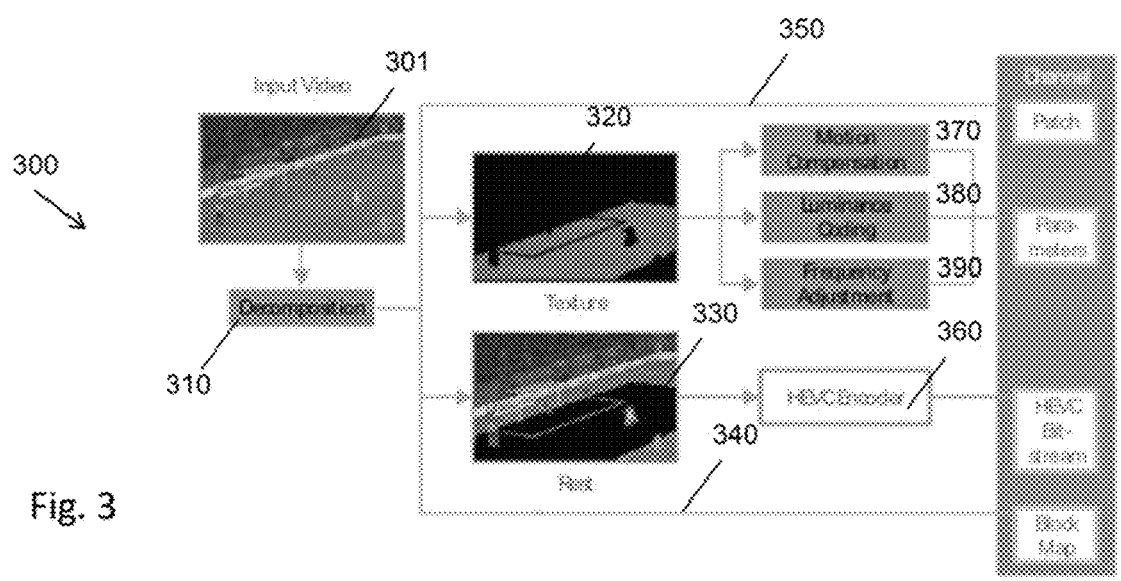
FIG. 3 is a schematic drawing illustrating functionality of an encoder supporting both texture coding and hybrid coding.

FIG. 3 illustrates functional aspects of the encoder 100 of FIG. 1. In particular, and an encoder 300 according to an embodiment of the invention receives an input video frame 301 and decomposes 310 the video frame into synthesizable portion (texture) 320 and a non-synthesizable remaining portion (rest) 330. Moreover, a control information concerning the decomposition 340 is provided as an output of the encoder. For instance, a block map, indicating for each block of the input video frame whether it is pertaining to synthesizable or non-synthesizable region, is output. For the synthesizable regions, a representative patch 350 may be further output. The non-synthesizable region 330 is then encoded 360 with a conventional encoder. The conventional encoding 360 in this example is HEVC and coding which results into HEVC bitstream on the output. The texture 320 is then analyzed, which means that based on the representative patch and predefined operations with adjustable parameters each texture block is approximated. In other words, for the given patch and the given texture block parameters for the predefined operations are selected to minimise the difference between the texture block and that the patch. In FIG. 3, the predefined operations include motion compensation 370, luminance coding 380, and frequency adjustment 390. The parameters of these three operations are then output. The output HEVC bitstream, texture parameters, patch, and block map, are stored and/or transmitted and form the encoded video. For instance, the encoded video may be stored and/or transmitted in form of a bitstream including the HEVC bitstream, and binarized texture parameters, patch, and block map.

Figure 4:
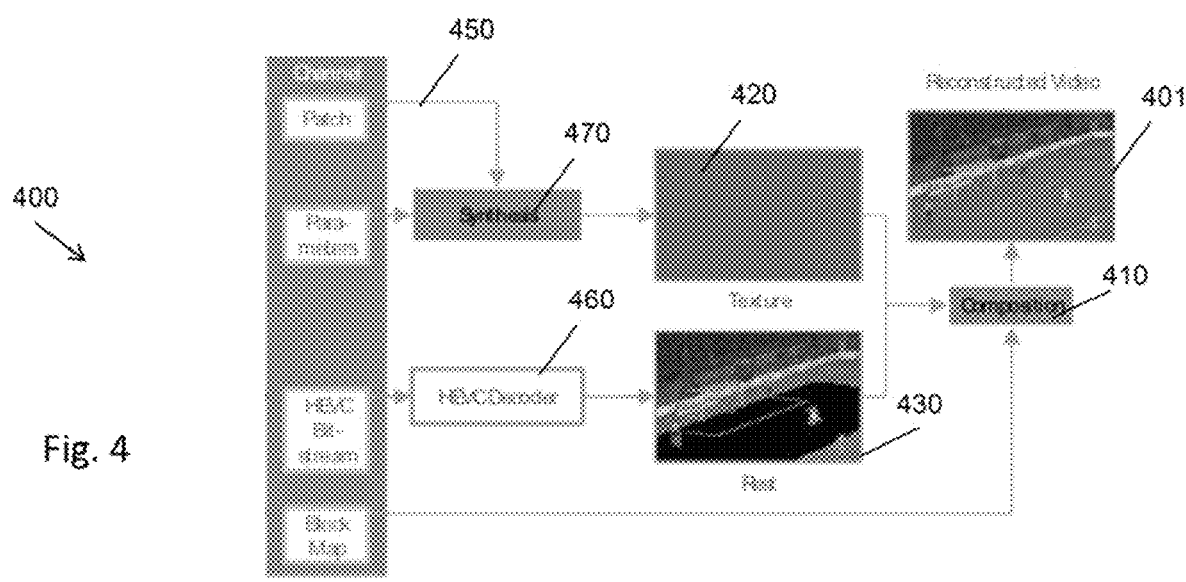
FIG. 4 is a schematic drawing illustrating functionality of a decoder supporting both texture decoding and hybrid decoding.

FIG. 4 illustrates a decoder 400 capable of decoding the encoded video output from the encoder 300 described above with reference to FIG. 3. In particular, the above-mentioned parameters including HEVC bitstream, texture parameters, patch, and block map are parsed/decoded from data retrieved from a storage or received from a channel. The HEVC bitstream is input to HEVC decoder 460 which performs decoding according to the HEVC standard and output the decoded non-synthesizable regions 430. The texture parameters and the patch information 450 are input to a synthesis 470 which synthesizes texture based on the patch by applying to the patch the motion compensation, the luminance coding and the frequency adjustment according to the parameters input. The resulting texture 420 together with the non-synthesizable portion 430 are combined in a composition unit 410 in accordance with the received block map 440 to obtain reconstructed video frame 401.

In other words, an aspect of the present disclosure relates to the idea that an image 301 can be decomposed 310 in textured 320 and non-textured 330 regions. By selecting a small image patch 350 most important structural information of the textured region 320 can be represented. Using patch-based texture synthesis algorithms 470, the structural information of the region 420 is reconstructed from this patch 450 in the decoder 400. Since lighting and blurring information is lost when simply replacing the region with a synthesized image, these are signaled as a sparse representation, for instance, in a slice header. For image sequences the synthesis only needs to be done a single time for a tracked region of similar texture.

In this document, the term "texture" refers to an image portion (including, e.g., one or more color components) and includes information about the spatial arrangement of color or intensities in the image portion. The image portion normally exhibits spatial homogeneity or sequences of images of moving scenes that exhibit certain stationarity properties in time., see e.g., U. S. Thakur, K. Naser, M. Wien, Dynamic texture synthesis using linear phase shift interpolation, PCS 2016, December, 2016.

Figure 5:
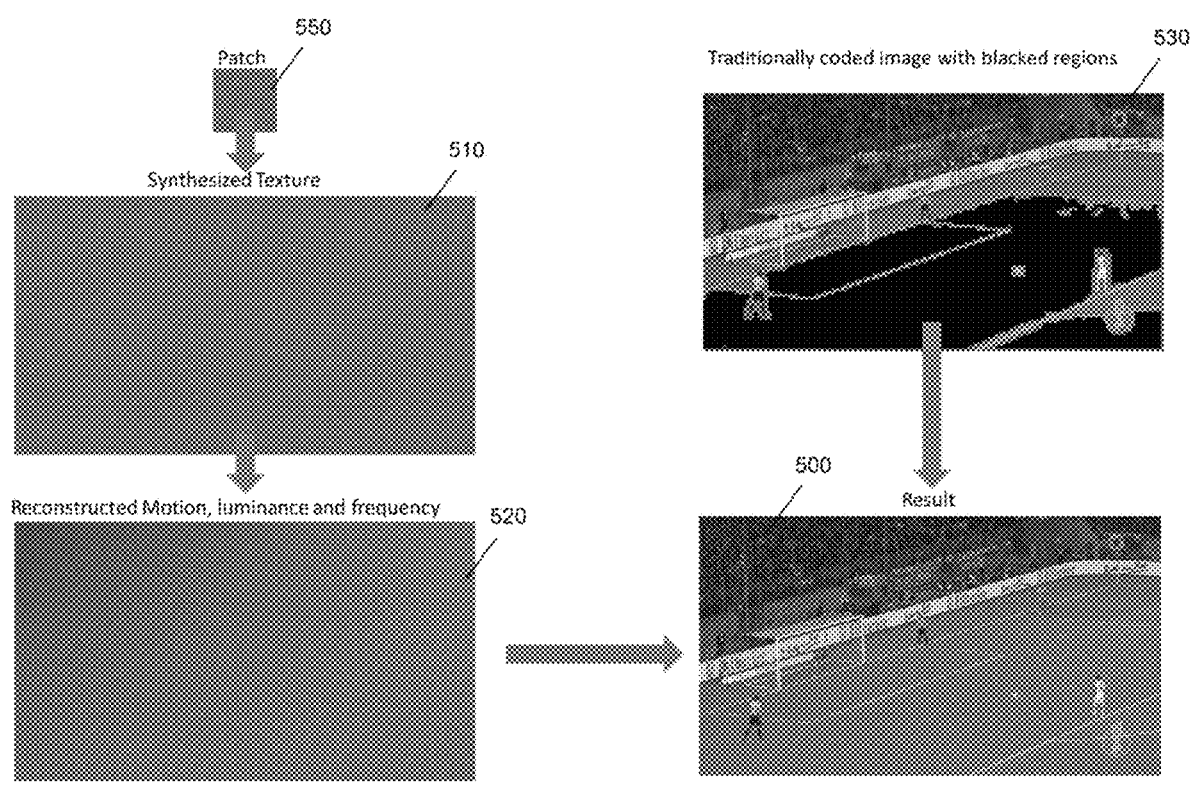
FIG. 5 is a schematic drawing illustrated image portions in different stages of the texture region reconstruction.

FIG. 5 illustrates various partial results during the image reconstruction as shown in FIG. 4. In particular, a patch 550 is used to generate a texture image 510 by simply copying the patch to the entire image area. Then, the synthesized texture 510 is further adapted, for instance as mentioned above by reconstructing the motion, luminance and frequency. The resulting image 520 obtained after the adjustment(s) is then combined with the conventionally coded image 530 with the blackened portions corresponding to the textured area. The combined decoded image 500 includes both, the reconstructed textured (synthesizable) region and the non-synthesizable (rest) region.

Figure 6A:
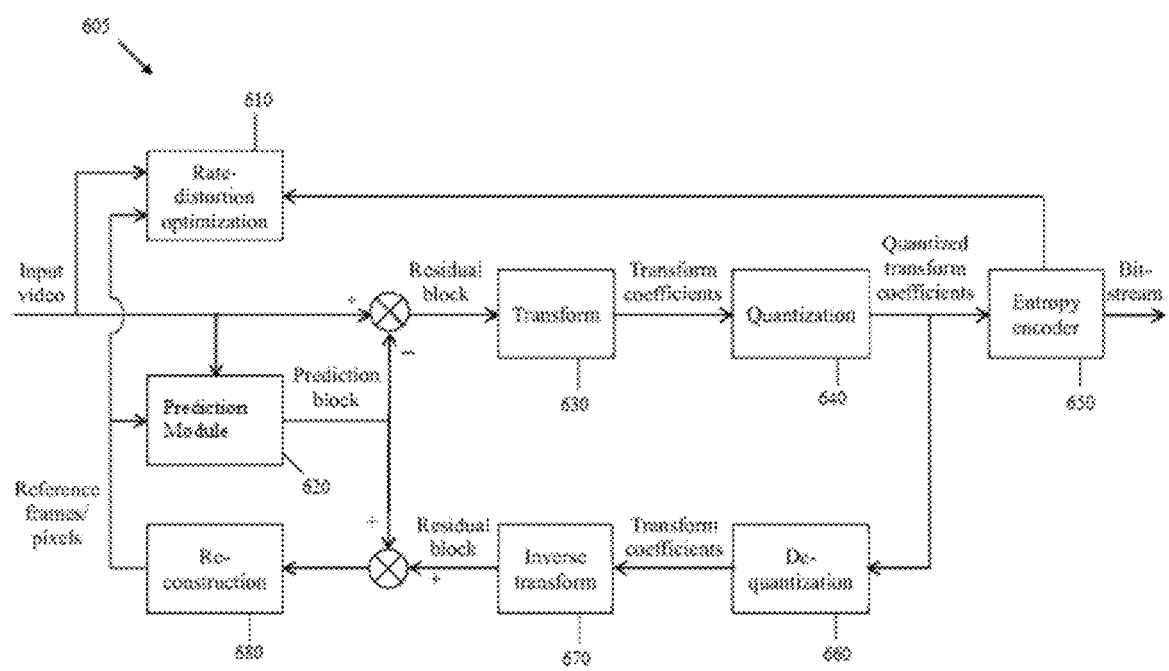
FIG. 6A is a block diagram illustrating a hybrid encoder.

FIG. 6A shows an overview of the conventional encoder 605 applying hybrid coding which means encoding including a plurality of encoding steps or stages such as prediction 620, transformation 630, quantization 640, and entropy coding 650. It is noted that conventional coders such as AVC or HEVC also employ hybrid coding.

In the following, the HEVC encoding and decoding is briefly described. HEVC stands for High-Efficiency Video Coding and is a follower of the AVC (H.264) video coding standard.

An encoder 605 which comprises an input for receiving input image samples of frames or pictures of a video stream and an output for generating an encoded video bitstream. The term "frame" in this disclosure is used as a synonym for picture. However, it is noted that the present disclosure is also applicable to fields in case interlacing is applied. In general, a picture includes m times n pixels. This corresponds to image samples and may comprise one or more color components. For the sake of simplicity, the following description refers to pixels meaning samples of luminance. However, it is noted that the motion vector search of embodiments of the invention can be applied to any color component including chrominance or components of a search space such as RGB or the like. On the other hand, it may be beneficial to only perform motion vector estimation for one component and to apply the determined motion vector to more (or all) components.

The input blocks (also referred to sometimes as coding units, CU, or processing units, PU) to be coded do not necessarily have the same size. CU is a basic coding a structure of the video sequence of a pre-defined size, containing a part of a picture (e.g. 64×64 pixels). It is usually of regular, rectangular shape, describing encoded area of the picture using syntax specified for a coding mode selected for the block.

One picture may include blocks of different sizes and the block raster of different pictures may also differ. In an explicative realization, the encoder 605 is configured to apply prediction, transformation, quantization, and entropy coding to the video stream. The transformation, quantization, and entropy coding are carried out respectively by a transform unit 630, a quantization unit 640 and an entropy encoding unit 650 so as to generate as an output the encoded video bitstream.

The video stream may include a plurality of frames, wherein each frame is divided into blocks of a certain size that are either intra or inter coded. The blocks of for example the first frame of the video stream are intra coded by means of an intra prediction unit which may be part of the prediction unit 620. An intra frame is coded using only the information within the same frame, so that it can be independently decoded and it can provide an entry point in the bitstream for random access. Blocks of other frames of the video stream may be inter coded by means of an inter prediction unit which may be part of the prediction unit 620: information from previously coded frames (reference frames) is used to reduce the temporal redundancy, so that each block of an inter-coded frame is predicted from a block in a reference frame. A mode selection unit which may also be part of the prediction unit 620 is configured to select whether a block of a frame is to be processed by the intra prediction unit or the inter prediction unit. This mode selection unit also controls the parameters of intra or inter prediction. In order to enable refreshing of the image information, intra-coded blocks may be provided within inter-coded frames. Moreover, intra-frames which contain only intra-coded blocks may be regularly inserted into the video sequence in order to provide entry points for decoding, i.e. points where the decoder can start decoding without having information from the previously coded frames.

The intra estimation unit and the intra prediction unit are units which perform the intra prediction. In particular, the intra estimation unit may derive the prediction mode based also on the knowledge of the original image while intra prediction unit provides the corresponding predictor, i.e. samples predicted using the selected prediction mode, for the difference coding. For performing spatial or temporal prediction, the coded blocks may be further processed by an inverse quantization unit 660, and an inverse transform unit 670. After reconstruction of the block a loop filtering may be applied to further improve the quality of the decoded image. The filtered blocks then form the reference frames that are then stored in a decoded picture buffer. Such decoding loop (decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding to the decoded residual block the prediction block.

The inter estimation unit receives as an input a block of a current frame or picture to be inter coded and one or several reference frames from the decoded picture buffer. Motion estimation is performed by the inter estimation unit whereas motion compensation is applied by the inter prediction unit. The motion estimation is used to obtain a motion vector and a reference frame based on certain cost function, for instance using also the original image to be coded. For example, the motion estimation unit may provide initial motion vector estimation. The initial motion vector may then be signaled within the bitstream in form of the vector directly or as an index referring to a motion vector candidate within a list of candidates constructed based on a predetermined rule in the same way at the encoder and the decoder. The motion compensation then derives a predictor of the current block as a translation of a block co-located with the current block in the reference frame to the reference block in the reference frame, i.e. by a motion vector. The inter prediction unit outputs the prediction block for the current block, wherein said prediction block minimizes the cost function. For instance, the cost function may be a difference between the current block to be coded and its prediction block, i.e. the cost function minimizes the residual block. The minimization of the residual block is based e.g. on calculating a sum of absolute differences (SAD) between all pixels (samples) of the current block and the candidate block in the candidate reference picture. However, in general, any other similarity metric may be employed, such as mean square error (MSE) or structural similarity metric (SSIM).

However, cost-function may also be the number of bits necessary to code such inter-block and/or distortion resulting from such coding. Thus, the rate-distortion optimization procedure may be used to decide on the motion vector selection and/or in general on the encoding parameters such as whether to use inter or intra prediction for a block and with which settings.

The intra estimation unit and inter prediction unit receive as an input a block of a current frame or picture to be intra coded and one or several reference samples from an already reconstructed area of the current frame. The intra prediction then describes pixels of a current block of the current frame in terms of a function of reference samples of the current frame. The intra prediction unit outputs a prediction block for the current block, wherein said prediction block advantageously minimizes the difference between the current block to be coded and its prediction block, i.e., it minimizes the residual block. The minimization of the residual block can be based e.g. on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The inter estimation unit receives as an input a block or a more universal-formed image sample of a current frame or picture to be inter coded and two or more already decoded pictures. The inter prediction then describes a current image sample of the current frame in terms of motion vectors to reference image samples of the reference pictures. The inter prediction unit outputs one or more motion vectors for the current image sample, wherein said reference image samples pointed to by the motion vectors advantageously minimize the difference between the current image sample to be coded and its reference image samples, i.e., it minimizes the residual image sample. The predictor for the current block is then provided by the inter prediction unit for the difference coding.

The difference between the current block and its prediction, i.e. the residual block, is then transformed by the transform unit 630. The transform coefficients are quantized by the quantization unit 640 and entropy coded by the entropy encoding unit 650. The thus generated encoded picture data, i.e. encoded video bitstream, comprises intra coded blocks and inter coded blocks and the corresponding signaling (such as the mode indication, indication of the motion vector, and/or intra-prediction direction). The transform unit 630 may apply a linear transformation such as a Discrete Fourier Transform (DFT)/Fast Fourier Transform (FFT) or Discrete Cosine Transformation (DCT). Such transformation into the spatial frequency domain provides the advantage that the resulting coefficients have typically higher values in the lower frequencies. Thus, after an effective coefficient scanning (such as zig-zag), and quantization, the resulting sequence of values has typically some larger values at the beginning and ends with a run of zeros. This enables further efficient coding. Quantization unit 640 performs the actual lossy compression by reducing the resolution of the coefficient values.

The entropy coding unit 650 then assigns to coefficient values binary codewords to produce a bitstream. The entropy coding unit 650 also codes (generates syntax element value and binarizes it) the signaling information. Variable length coding or fixed length coding is applied to some syntax elements. In particular, context-adaptive binary arithmetic coding (CABAC) may be used.

It is noted that the bitstream is organized based on the syntax defined by the standard. For example, blocks are grouped into slices which are individually decodable, i.e. do not depend from other slices in the same picture. The compressed video samples of the blocks within the slices are typically preceded by control (signaling information) referred to as a slice header. This control information carries parameters common for encoding/decoding the blocks within the slice. Moreover, SPS (Sequence Parameter Set) and PPS (Picture Parameter Set) are portions of the bitstream (containers) carrying control information which is relevant for one or more frames or for the entire video. Video sequence in this sense is a set of subsequent frames presenting motion picture. In particular, the SPS in HEVC is set of parameters sent in form of organized message containing basic information required to properly decode the video stream; must be signaled at the beginning of every random access point. PPS is a set of parameters sent in form of organized message containing basic information required to properly decode a picture in the video sequence.

Figure 6B:
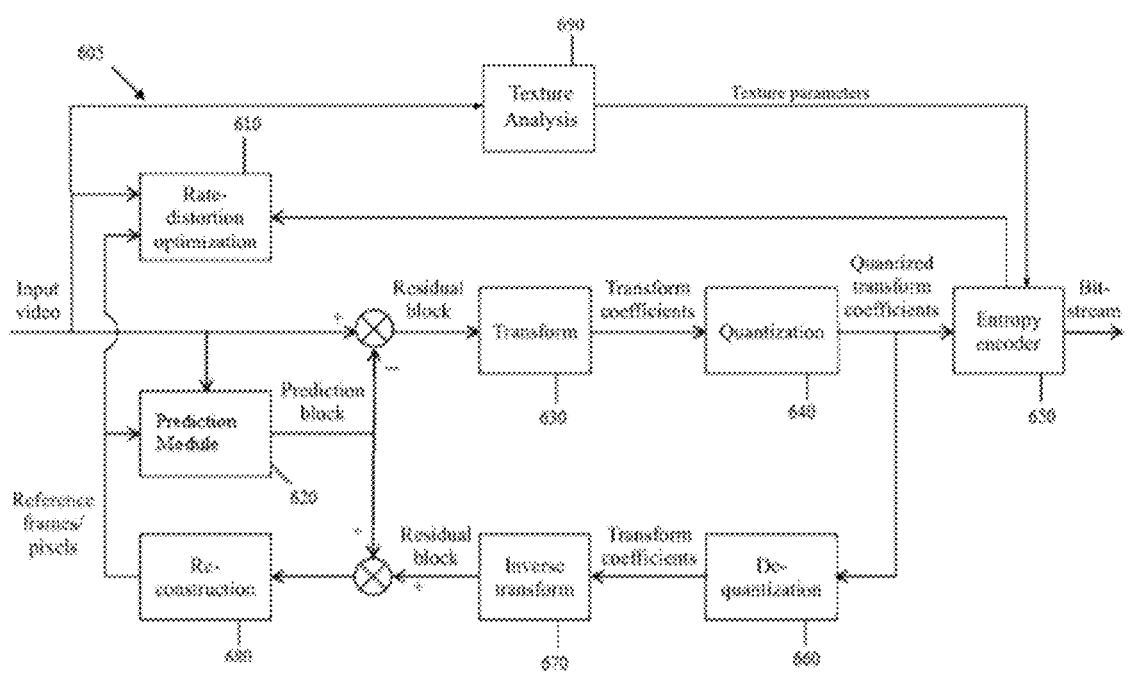
FIG. 6B is a block diagram illustrating the hybrid encoder with alternative texture encoder.

FIG. 6B shows an overview of a conventional encoder supplemented with encoder based on texture analysis 690. As can be seen in FIG. 6B, the input video is first subdivided into synthesizable portion and non-synthesizable portion. The synthesizable portion is provided for the texture analysis 690 which outputs texture parameters for the bitstream as described above with reference to FIG. 3.

Figure 7A:
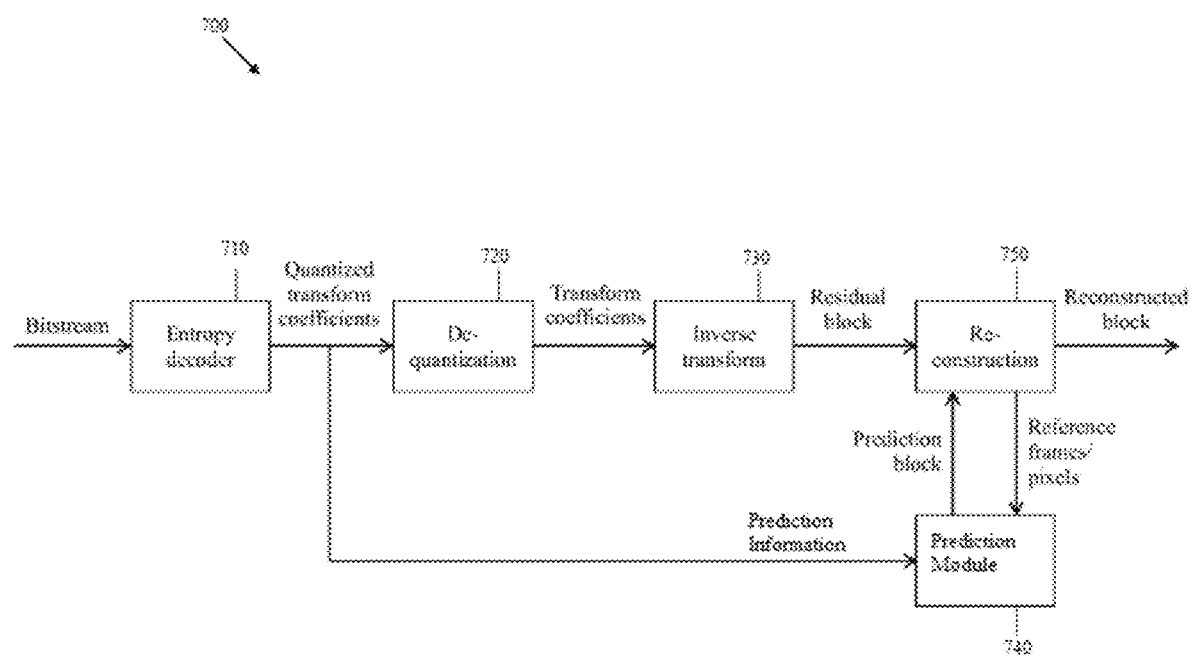
FIG. 7A is a block diagram illustrating a hybrid decoder.

FIG. 7A shows an overview of the conventional decoder 700 capable of decoding a bitstream generated by a conventional encoder 605 is described with reference to FIG. 6A. In particular, the conventional decoder 700 receives a bitstream as an import performance entropy decoding 710 resulting in quantised transfer coefficients and control information. The quantised transform coefficients out the quantised 720, inverse transformed 730, and the resulting residual block is provided for reconstruction. The control information controls the prediction module 740 which generates a prediction block to be combined with the residual block in the reconstruction unit 750 to obtain the reconstructed block of the image. This approach is repeated for all blocks of the image.

Similarly, HEVC video decoding is visualized in FIG. 7A. FIG. 7A shows a video decoder 700. The video decoder 700 comprises particularly a decoded picture buffer, an inter prediction unit and an intra prediction unit, which form a block prediction unit 740. The decoded picture buffer is configured to store at least one (for uni-prediction) or at least two (for bi-prediction) reference frames reconstructed from the encoded video bitstream, said reference frames being different from a current frame (currently decoded frame) of the encoded video bitstream. The intra prediction unit is configured to generate a prediction block, which is an estimate of the block to be decoded. The intra prediction unit is configured to generate this prediction based on reference samples that are obtained from the decoded picture buffer.

The decoder 700 is configured to decode the encoded video bitstream generated by the video encoder 605, and preferably both the decoder 700 and the encoder 605 generate identical predictions for the respective block to be encoded/decoded. The features of the decoded picture buffer and the intra prediction unit are similar to the features of the decoded picture buffer and the intra prediction unit of FIG. 6.

The video decoder 700 comprises further units that are also present in the video encoder 605 like e.g. an inverse quantization unit 720, an inverse transform unit 730, and a loop filtering, which respectively correspond to the inverse quantization unit 720, the inverse transform unit 730, and the loop filtering of the video coder 605.

An entropy decoding unit 710 is configured to decode the received encoded video bitstream and to correspondingly obtain quantized residual transform coefficients and signaling information. The quantized residual transform coefficients are fed to the inverse quantization unit 720 and an inverse transform unit 730 to generate a residual block. The residual block is added in reconstruction unit 750 to a prediction block and the addition is fed to the loop filtering to obtain the decoded video. Frames of the decoded video can be stored in the decoded picture buffer and serve as a decoded picture for inter prediction. The entropy decoding unit 710 may correspond to the decoder which parses from the bitstream the signal samples as well as the syntax element values and then maps the corresponding control information content based on a semantic rule.

Figure 7B:
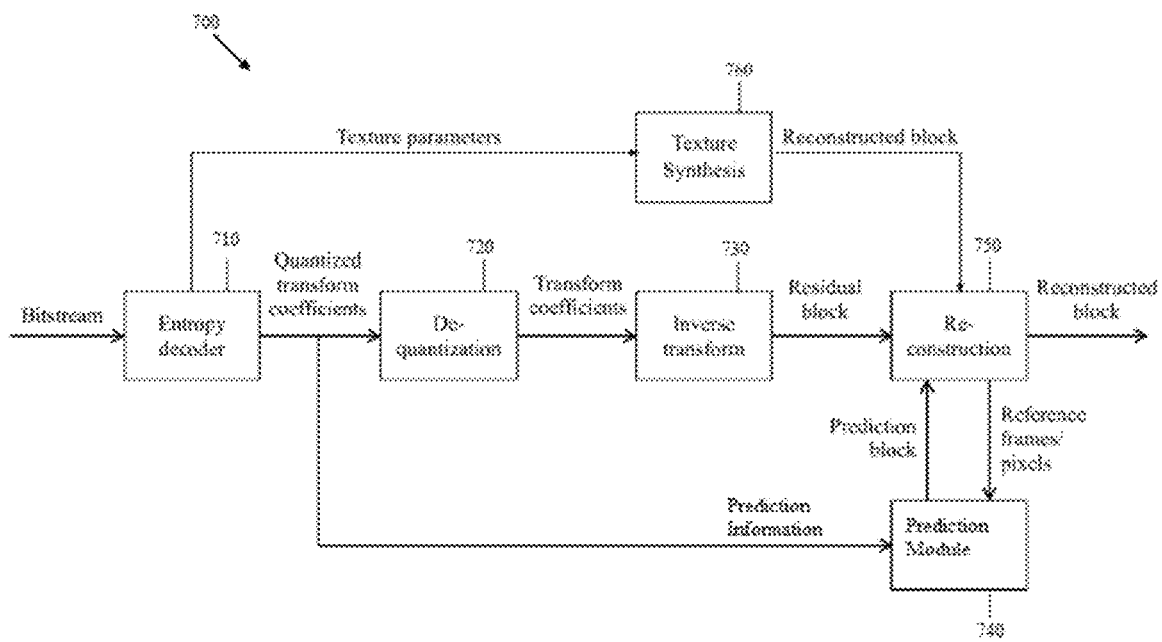
FIG. 7B is a block diagram illustrating the hybrid decoder with alternative texture decoder.

FIG. 7B shows an overview of a conventional decoder supplemented with the decoder based on texture analysis 760. In particular the texture synthesis 760 receives the texture parameters (including the patch information) and synthesizes the texture block. The texture block is provided for reconstruction which in this case merely means inserting the synthesized texture block onto the appropriate place in the image for instance according to the block map also obtained from the bitstream by the entropy decoder 710.

In the following, a detailed description of embodiments of the present invention concerning different parts of textured analysis and synthesis are described.

In particular, the texture analysis performed at the encoder includes detection and tracking of the texture region or more regions, extracting a representative texture patch, determine adjustment parameters for adjusting the patch-based synthesized region on a frame or block basis, and signal the location of the texture region, the patch and the adjustment parameters for the decoder. The decoding involves extracting the signaled information, reconstructing the texture based on the signaled patch and the adjustment parameters and combined the reconstructed texture with the remaining image based on the signaled location information.

Region Detection

In accordance to an embodiment, the processing circuitry implementing texture region coding is, for example, configured to: detect the texture region within a video frame by using clustering; generate texture region information indicating the location of the texture region within the video frame; and insert the texture region information into the bitstream. The clustering may be performed by any known approach capable of identifying image portions of a similar character. In general, the texture region may also be detected by other means than clustering such as a trained neural network with or without having a priori knowledge of the texture's properties, block-based feature extraction and classification of the blocks as texture when the extracted features fulfill certain conditions.

Figure 8:
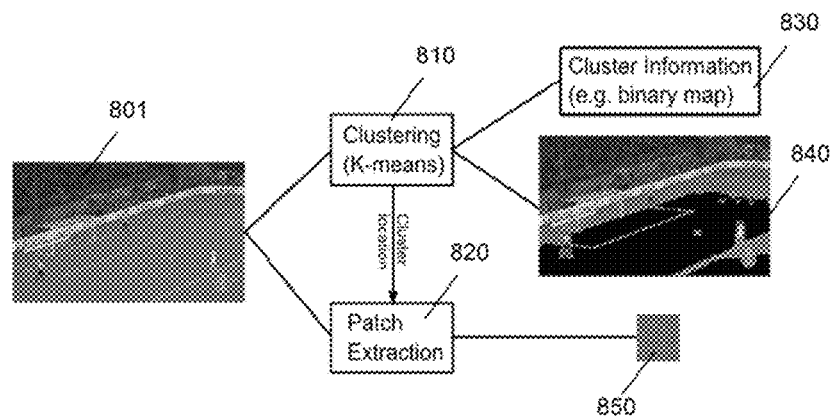
FIG. 8 is a schematic drawing illustrating processing for detection of synthesizable regions in an image.

FIG. 3 shows decomposition unit 310 which performs region detection. FIG. 8 shows a pipeline of the clustering and patch extraction performed by the decomposition unit 310. In particular, for detection of a synthesizable region the input image 801 needs to be first clustered 810 into different regions with similar texture. In one embodiment, this is done by applying a K-means clustering where the feature vector for each pixel consists of the three color values and the image coordinates. This five-dimensional vector not only enforces similar color but also spatial proximity. K-means clustering is described, for instance, in MacQueen, J. B. (1967). *Some Methods for classification and Analysis of Multivariate Observations. Proceedings of 5th Berkeley Symposium on Mathematical Statistics and Probability.* 1. University of California Press. pp. 281-297.

Other clustering and classification methods are conceivable. Embodiments of the present invention are not limited with respect to any particular clustering and classification. It is also noted that a pixel may include one or more color values and is not limited to the above exemplified three values. For instance, there may be color spaces including three color components such as red, green, blue, and white. Moreover, the embodiments of the present invention are also applicable to greyscale images.

FIG. 8 shows the clustering 810 and patch extraction step 820. The upper part shows the image getting split into the clustering information 830 and the remaining image 840 using the clustering algorithm (e.g. K-means). In this embodiment the cluster information 830 may be written into a text file. The clustering information may be a bitmap of which each bit represents an image pixel and indicates whether or not the image pixel belongs to the texture cluster or to the remaining image. Alternatively, the clustering may be performed on a block basis, which means that for each block the decision is made on whether or not the block belongs to a texture region or to the remaining image region. Correspondingly, the cluster information may be represented by a bitmap in which each bit represents whether or not the respective block of input image belongs to the synthesizable regions (texture) or to non-synthesizable regions (remaining image).

The remaining region 840 consists of the original image where all pixel values in regions suitable for texture synthesis are set to black. The black color is merely exemplary and means that the pixel sample values are set to 0. However, embodiments of the present invention are not limited to this kind of marking the texture region. For some kinds of encoding it may be beneficial to replace the texture portion by interpolating them from the surrounding pixel values. As an alternative solution, the texture portion might be forced to be coded such as skip mode of HEVC.

The lower part of FIG. 8 shows the patch extraction step 820 which copies a small part of a region 850 detected as synthesizable. In this embodiment the patch 850 has a size of 64×64 pixels. It is noted, that the size of the patch may differ from this example. Accordingly, a smaller or larger size may be selected. A larger size of the patch provides greater variance of the texture. On the other hand, transmission of a larger patch requires more rate. It is noted that the patch does not have to have a square shape. It may be a rectangle with a size of n×m, with n and m being non-zero integers differing from each other. In other words, the embodiments of the present invention are not limited to any form or size of the patch.

Embodiments of the present invention are not limited to employing a one single patch. Alternatively, one or more patches may be identified and provided to the decoder for reconstruction of one texture region, possibly with the information which of the patches is to be applied or written information concerning weights to combine the patches.

The cluster information may be further compressed, for instance, by bitmap compression approaches including lossless compression such as a run length coding or other approaches known from facsimile compression. However, the cluster information may also be inserted into the bitstream uncompressed. Similarly, the patch 850 may be provided in an uncompressed form or further compacted by employing any variable length coding such as Huffman coding, arithmetic coding, or the like.

Region Tracking

In a video, the size and the location of the texture regions may vary from image to image. On the other hand, in natural video sequences as well as animations and computer graphics adjacent images (video frames) are typically similar. This is caused by typically smooth movement of the objects and/or background within the image in absence of a scene cut. Correspondingly, it may not be necessary to perform the classification in each and every video image. Instead, region tracking may be performed in order to detect the changes in size and location of the texture region.

It is noted that in general, there may be more than one region with different respective textures and the remaining non-texture part(s) of the frame. In such a case, each of the texture regions may be processed as described by the present disclosure, i.e. determined by clustering, represented by a patch and parameters for adjusting the patch.

Tracking a region of similar texture through an image stream is important to achieve temporal consistency. To track a region, a tracking algorithm based on feature vectors for the regions is applied according to an exemplary embodiment. If there are prior frames to the newly detected regions of the current frame, these are matched to the previous regions. This can be done by one of several matching algorithms and different feature vectors. The following describes one possible implementation. In this instance it is done by a Hungarian matching algorithm described in H. W. Kuhn and B. Yaw, "*The hungarian method for the assignment problem,*" Naval Res. Logist. Quart, pp. 83-97, 1955. The Hungarian graphs edge weights are linear combinations of three distances F1, F2, and F3 between regions in the consecutive frames. These are:

F1: Coordinates of centroid,
F2: Number of pixels, and
F3 Position of pixels.

Features based on motion such as average speed of pixels in clusters are also possible. There may be further alternative or additional features applied for the purpose of cluster matching. With these features, distance metrics for every combination of clusters for the i-th frame are defined as:

$D1 = F1_i - F1_{i-1}$ $D2 = F2_i - F2_{i-1}$ $D3 = \text{overlap}(F3_i - F3_{i-1})$, where the function overlap(●) calculates the number of pixels that are in both clusters, i.e. in clusters of both frames I and i−1.

Another distance metric may be defined as follows:

$$D4 = thresh(F2_i), \text{ where } thresh(F2i) = \begin{cases} inf, & F2_i < t \\ 0, & F2_i \geq t \end{cases}$$

In other words, the distance D4 penalizes regions which have a too small number of pixels defined by the threshold t. The threshold t is a non-zero integer. The term "inf" stands for infinity and the distance D4 is set to infinity if the region has less than t pixels, which means that the region is no longer considered as a texture cluster. On the other hand, the pixel regions having t or more than t pixels are considered as texture clusters. Alternatively, the function thresh(F2i) may return t instead of 0 if $F2_i \geq t$.

The metrics D1 and D3 may consider the motion of a cluster. By summing over the weighted distances a joint distance D may be calculated by:

$$D = \sum_i \alpha_i D_i$$

where αi is the weight assigned to the respective distance Di. While the above mentioned features are shape and location based they do not allow detection of quickly changing colors (e.g. a light switching color). Simply adding features and distance metrics based on color similarity enables the algorithm to detect these color changes. If no corresponding region is found the synthesizable region has to be newly determined.

The above-described region tracking is a part of decomposition 310 described with reference to FIG. 3. In other words, in order to perform the decomposition 310, regions have to be detected by clustering as shown in FIG. 8 for frames in which new regions occur and have to be tracked for frames in which regions similar to newly detected regions occur. The results of the region tracking may be used to update the block map, which may be signaled to the decoder upon change or regularly. For instance, a flag may be employed indicating whether or not the updated block map is transmitted within a signaling common to or more video pictures.

It is noted that the patch extraction 820 is only necessary when the new region is detected. The same patch may be used for the same region tracked over multiple frames. Accordingly, the patch information 850 may be signaled only with a new region. This enables to keep the rate low. However, the embodiments of the present invention are not limited to the above, for example the patch may be updated, i.e. sent, even if the corresponding region is still tracked. For instance, the patch may be updated regularly.

Motion Compensation

In case the texture is only synthesized a single time for a sequence of images with a similar texture, it has to be adjusted (for instance moved and deformed) for each frame. Since one textured region typically deforms uniformly, the motion compensation for this region can be calculated for the whole image. Most detected textures lie on a plane in the underlying 3D scene. That means that camera motions such as pan, tilt, and zoom result in linear deformations of the textured area in the camera plane. Other geometries require a higher order polynomial. Embodiments of the present invention are not restricted to a planar texture.

In order to adjust the synthesized texture, the processing circuitry implementing the texture based coding may be further configured to: estimate motion for the texture region; generate motion information according to the estimated motion; and code the motion information into the bitstream. At the decoder, similarly, the motion information may be extracted and applied to the synthesized texture in order to adjust it.

In particular, according to an embodiment, the estimation of motion is performed by calculating optical flow between the texture region in a first video frame and the texture region in a second video frame preceding the first video frame; and the motion information is a set of parameters which is determined by fitting the optical flow to a two-dimensional polynomial of a first order or a second order. Correspondingly, at the decoder, the set of parameters is extracted from the motion information carried in the bitstream. Then a function given by the set of parameters is applied to the synthesized texture region.

According to an exemplary embodiment a plane is calculated that approximates these deformations in x- and y-direction, respectively. The plane corresponding to the deformation u in x-direction is described by the first order polynomial:

$$a0+a1x+a2y=u,$$

where x and y are the image coordinates, and coefficients a0 to a2 are the plane parameters for adjustment in x-direction. Thus can be also written in a vector form as:

$$(a_0, a_1, a_2)\begin{pmatrix}1\\x\\y\end{pmatrix} = u$$

With v as deformation in y-direction, the other plane can be defined similarly as $$a3+a4x+a5y=v.$$

Similarly, x and y are the image coordinates, and coefficients a3 to a5 are the plane parameters for adjustment in y-direction.

Accordingly, only six parameters are sufficient in this embodiment to reconstruct the deformation of the synthesized area in two consecutive frames. These polynomial parameters may be signaled through PPS, VPS, and/or slice header. If textures lie on other geometries than planes or a perspective camera model is considered, a higher order polynomial can be used and the corresponding parameters signaled.

The deformation is obtained by the dense optical flow between these two frames. In other words, the plane functions u and v are fitted to the optical flow obtained between the two frames. Such dense optical flow algorithm could be the algorithm of D. Sun, S. Roth, and M. J. Black, "*Secrets of optical flow estimation and their principles*," in *IEEE Conf. on Computer Vision and Pattern Recognition (CVPR)*. *IEEE*, June. 2010, pp. 2432-2439 in the Classic+NL implementation known from D. Sun, S. Roth, and M. J. Black. *A quantitative analysis of current practices in optical flow estimation and the principles behind them. IJCV,* 106(2), 2014.

In this embodiment the optical flow objective function is written in its spatially discrete form as:

$$E(u, v) = \sum_{i,j} \{\rho_D(I_1(i, j) - I_2(i + u_{i,j}, j + v_{i,j})) + \lambda[\rho_S(u_{i,j} - u_{i+1,j}) + \rho_S(u_{i,j} - u_{i,j+1}) + \rho_S(v_{i,j} - v_{i+1,j}) + \rho_S(v_{i,j} - v_{i,j+1})]\},$$

where u and v are the horizontal and vertical components of the optical flow fields that is calculated from input images $I_1$ and $I_2$. $\rho_D$ is a data penalty function and $\rho_S$ is a spatial penalty function. $\lambda$ is a regularization parameter. In other words; the calculation of the optical flow is performed by a function which penalizes higher distances between the components of the optical flow and/or higher differences between the corresponding samples of the first and the second video frame.

Here, the quadratic penalty $\rho(x)=x^2$ is used is used for $\rho_D$ and $\rho_S$, respectively. The objective function is solved using a multi-resolution technique to be able to estimate flow fields with larger displacements. In other words, the optical flow objective function E(u, v) is minimized to find the parameters u and v.

Figure 9:
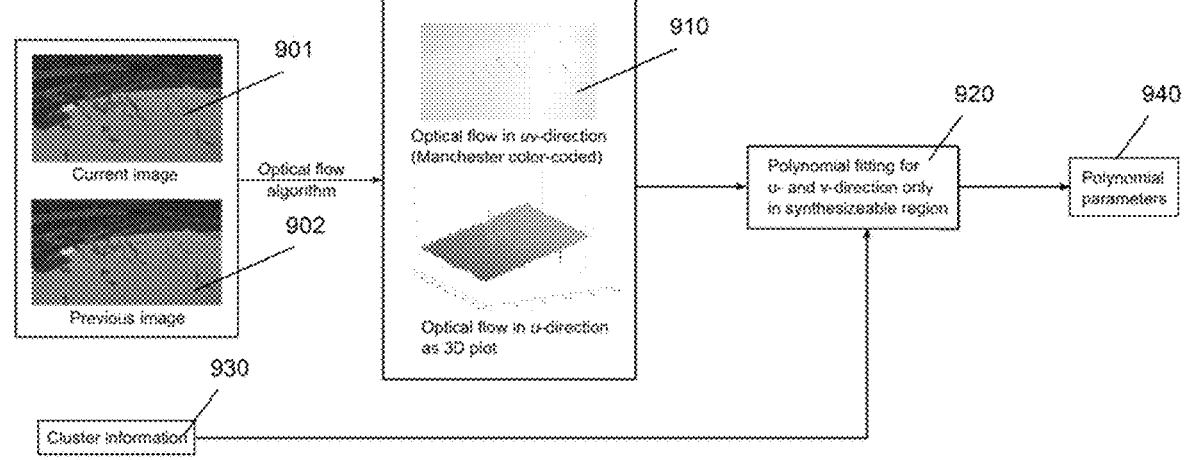
FIG. 9 is a schematic drawing illustrating processing for motion compensation of synthesizable regions in an image.

FIG. 9 shows the pipeline for the motion compensation technique. The optical flow algorithm calculates the optical flow vector field that is visualized in FIG. 9. In particular, optical flow is calculated between current image 901 and previous image 902 as described above. Examples of the calculated optical flow in uv direction and in u direction 910 as shown in FIG. 9 for the images 901 902. The calculated optical flow is provided for polynomial fitting 920. Since the polynomial fitting is only performed for the synthesisable region, i.e. for the texture cluster, the cluster information 930 (corresponding to the cluster information 830) is also provided to the polynomial fitting block 920. The polynomial fitting block 920 calculates polynomial parameters 940, for instance, corresponding to a0 to a5 mentioned above, by fitting the planes in x and y direction to the calculated optical flow given by u and v. The bottom image in block 910 shows the flow in one image direction (u-direction). It can be seen that in this direction a plane can be fitted to the data as described above. Since motion compensation should only be done in the synthesizable region only, data lying in the region is considered by using the cluster information from the previous step.

Correspondingly, at the decoder, parameters a0 to a5 are extracted (parsed) from the bitstream. Samples of the synthesized texture given by coordinates x and y are then processed by calculating the adjusted samples on coordinates u and v of the modified texture region. The term "synthesized texture region" refers to the texture region which is synthesized by filling its samples (pixels) by copying therein the patch. The synthesized texture region may also correspond to the texture region filled with the patch samples an already further processed by adjusting luminance and/or frequency as will be described in the following in more detail. The herein presented adjustments (motion, luminance, frequency) may be applied sequentially in an arbitrary order. Alternatively, only a subset of the adjustment or only one of the adjustments is applied.

The above exemplified calculation of the optical flow is merely exemplary and, in general, any other approach for determining optical flow, or in general motion, can be applied. The determined optical flow is fitted to a parametric function in order to describe it by means of a limited set of parameters which may be conveyed to the decoder in order to adjust the texture synthesized from the patch accordingly. Moreover, it is noted that the motion adjustment does not have to be performed by determining optical flow for respective sample positions as shown above. Alternatively, motion vector determination similar to the motion vector determination described above for HEVC based on block matching or template matching may be performed, for instance for small texture blocks such as 2×2 or 4×4 or larger (possibly depending on the image resolution).

Luminance Coding

Since the luminance of the synthesized area can only contain luminance information included in the patch, only parts of the luminance information of the original image can be conveyed by indicating the patch.

Most textured regions are homogeneously lit meaning that there exists a lighting gradient over the textured area. When reconstructing the scene, lighting may be advantageous to obtain an area that blends in visually pleasantly to the neighboring blocks. In one embodiment, the luminance is adapted by extracting the luminance information from the original image a higher order polynomial is fit to the luminance map of the pixels of the whole image synthesizable region. The order of the polynomial depends on the lighting in the scene and determines the number of variables necessary to encode the luminance efficiently. Here, the term "luminance" refers to illumination, i.e. to brightness of the region. This, on the other hand, corresponds to the mean value of the samples in the region. It is noted that the illumination (or luminance) may be calculated only for one colour component such as the luminance/luma (Y) or a green component of RGB space. However, it may also be calculated separately for the different color space components.

In other words, according to an embodiment, the processing circuitry for performing texture encoding is further configured to: determine a set of parameters specifying luminance within the texture region by fitting the texture region samples to a two-dimensional function defined by the set of parameters; and code the set of parameters into the bitstream.

The function may be a two-dimensional polynomial. However, it is noted that the present disclosure is not limited thereto and other functions may be applied as well. Nevertheless, polynomial fitting provides an advantage of adjusting the luminance with a relatively small number of parameters to different luminance characteristics. For example, the two-dimensional polynomial has order one or two in each of the two dimensions.

Correspondingly, at the decoder, the synthesized texture region is adjusted. At first, the parameters are extracted from the bitstream and the corresponding function is applied to the texture region samples to adjust their luminance. In other words, the processing circuitry at the decoder may be configured to: decode a set of parameters from the bitstream; and the reconstruction further includes calculating a function of the texture patch luminance and the function being defined by the parameters of the set.

It is noted that even though the above shown embodiments show only one textured and one remaining regions, in general, an image may include one or more different textured regions. In such case, the above embodiments apply to each of the synthesizable regions.

A first order polynomial describing the luminance L may be sufficient for most cases:

$$b0+b1x+b2y=L,$$

where x and y are the image coordinates and b0 to b2 are the polynomial parameters. A higher order polynomial can be implemented similarly, by adding further quadratic and/or cubic and/or higher order terms. When there is a visible lighting spot in the area, a second order or higher order polynomial may provide better results. These polynomial parameters may be signaled through PPS, SPS or video parameter set (VPS), or slice header as they fit an entire frame.

Figure 10:
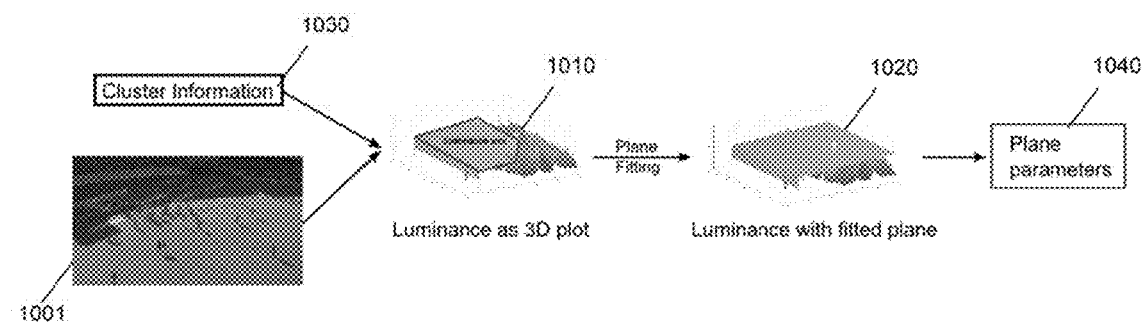
FIG. 10 is a schematic drawing illustrating processing for luminance adjustment of synthesizable regions in an image.

A visualization of the above procedure can be seen in FIG. 10. Input to the luminance fitting is an original image (input image) 1001 and cluster information 1030 which corresponds to the cluster information 930 and 830 referred to above it reference to FIGS. 9 and 8. The cluster information is used to distinguish the texture portions because only the texture portions are used for fitting the luminance. This is illustrated in a three-dimensional plot 1010 of the luminance corresponding to the input image 1001. After performing the polynomial fitting (first order in this example), the three-dimensional plot 1020 shows the luminance corresponding to plot 1010 together with the fitted plane. The parameters of the fitted plane 1040 are provided as an output for signaling to the decoder, for instance within the bitstream.

Figure 12:
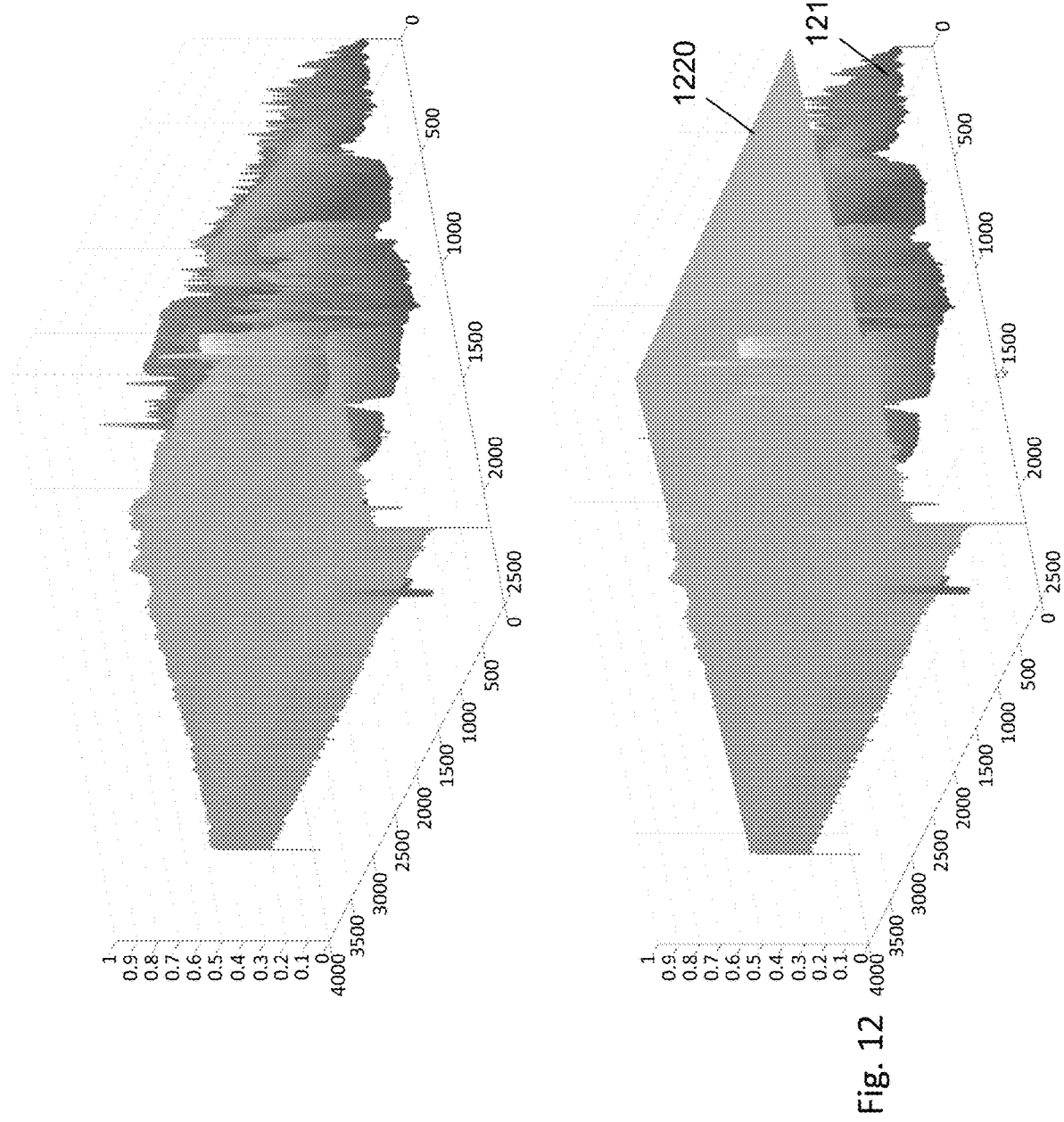
FIG. 12 is a schematic drawing illustrating processing results in different stages of luminance adjustment processing.

FIG. 12 shows on the top the enlarged version of the graph 1010 which shows the luminance of the input image 1001. On the bottom of FIG. 12, the plot 1020 showing the same luminance 1210, together with the fitted plane 1220 are shown.

The term luminance here refers, for instance, to the luma component Y of the YUV color space, i.e. to the samples of one component of a color space. However, the luminance adjustment may be also performed for each of the color components separately based on the same set of parameters or even based on separate sets of parameters determined for each of the color components individually. In case of gray-scale images the luminance corresponds to the sample value (brightness).

In order to enable a more accurate adjustment of the luminance, a higher order polynomial may be applied. For example, a second order polynomial may be used:

$$(b_1,b_2,b_3,b_4,b_5,b_6)(x,y,xy,x^2,y^2,1)^T=0$$

As described above a higher order polynomial may be fitted to the luminance values in synthesizable area using the cluster information of the clustering step.

Correspondingly, at the decoder, parameters b0 to b2 (for a $1^{st}$ order polynomial) or parameters b1 to b6 (for a $2^{nd}$ order polynomial) are extracted from the bitstream and the corresponding polynomial is applied to all sample positions given by coordinates x and y to obtain adjusted region. It is noted that the parameters bi (i=index) may be further encoded before inserting them into the bitstream, for instance by a variable length code and/or differential coding. This may be also the case for other parameter sets mentioned in the present disclosure.

Frequency Adjustment

Although a textured region has a similar structure in the whole region it may also include some perspective effects and motion blur.

In order to improve the synthesis, according to an embodiment, these effects may be compensated by applying a frequency adjustment.

In particular, the processing circuitry implementing encoder based on texture analysis in operation is configured to: identify a texture region within a video frame (picture) and a texture patch for said region, the region including a plurality of image (picture) samples; determine a first set of parameters specifying weighting factors for reconstructing spectral coefficients of the texture region by fitting the texture region in spectral domain to a first function of the texture patch determined according to the first set of parameters; and code the texture patch and the first set of parameters into a bitstream.

The identification of the texture region may be performed as discussed above with reference to texture region detection and tracking. The determination of the first function according to the first set of parameters is performed, for instance, in that the first function is a parametric function and the parameters or a subset of parameters of the first function are included or indicated in any way in the first set of parameters.

The processing circuitry may be further configured to: transform blocks of the texture region into spectral domain and transform the texture patch into the spectral domain to find for the transformed blocks respective frequency damping parameters by approximating each block with the patch damped with the respective damping parameter.

In other words, having the patch block and a fitting function F (the first function) described by fitting function parameters P, for a current block, such fitting function parameters are found, which minimize a cost function between the patch block and the current block in the spectral domain. The cost function may be a minimum mean square error (MMS) or a sum of absolute differences (SAD) or any other function. In particular, the following cost is minimized to obtain the parameter set P:

cost=cost_function(current block,F(patch block,P)).

The parameter set P is then signaled to the decoder for each block. In order to reduce the number of parameters to be signaled for each block, advantageously, the fitting function F has only one parameter. However, in general embodiments of the present invention are not limited to any particular number of parameters. The parameters P are referred to herein as damping parameters.

Alternatively, or in addition, in order to more efficiently convey parameter sets P for each block of the texture region, the step of coding the first set of parameters for all blocks of the texture region may include fitting the damping parameters P determined for the respective blocks and forming a damping parameter map to a damping parameter function DF (also referred to herein as block map function) which is parametrized with one or more parameters DP.

damping parameter map=DF(DP).

Accordingly, in order to signal all damping parameters of all blocks in the texture region, only parameters DP are signaled in the bitstream in this embodiment as the first set of parameters.

According to an exemplary implementation, the damping parameters P correspond to one scalar value. However, the present disclosure is not limited to such embodiment. In general, N damping maps may also be constructed for the respective N parameters pi from the set P, i being greater than one and smaller or equal to N which is an integer greater than one.

According to an exemplary implementation, the first function DF is a first two-dimensional polynomial. However, the present disclosure is not limited to such an implementation and, in general, a different function may be used. The two-dimensional polynomial has order one or two in each of the two dimensions, the two dimensions being vertical and horizontal (covering dumping parameter map in which there is for each block in a two-dimensional image of texture region a value of a damping parameter assigned). However, it is noted that embodiments of the present invention are not limited to any particular degree (order) of the polynomial. In general, any fixed (e.g. predefined in standard) order of polynomial may be used. Alternatively, the order of the polynomial may be also variable and indicated in the bitstream as a part of the first parameter set or elsewhere.

For example, the transformation for transforming the texture region into spectral domain is a block-wise discrete cosine transformation. On the other hand, the present disclosure is not limited to such examples and the transformation may be FFT, DFT, Karhunen-Loeve Transform (KLT), Hadamard, or any other linear transformation.

In the following, a detailed exemplary embodiment is presented. A block-wise transformation of a block in the original image and a block of the patch is calculated. To fit the block of the patch to the original we introduce a damping function for the AC components of the DCT-coefficients. A new coefficient $\widehat{c_{i,j}}$ at position $\{i,j\}$ in the block is calculated from the coefficient $c_{i,j}$ of the synthesized region by $$\widehat{c_{i,j}} = c_{i,j} d^{i+j}$$

where d is considered as the constant damping factor for this block.

Calculating the damping factor results in a damping map over the textured region. A second order polynomial is fitted to the damping map. Although the damping coefficient is calculated block-wise the fitted polynomial is calculated for the whole image. Since blurring an already high frequency block is visually more pleasing than sharpening it the patch is selected from a highest frequency region. The damping function is not restricted to the above. It can be any function that serves the same purpose. The order of the polynomial can be adapted to the sequence. These polynomial parameters may be signaled through PPS, VPS, and slice header.

Figure 11:
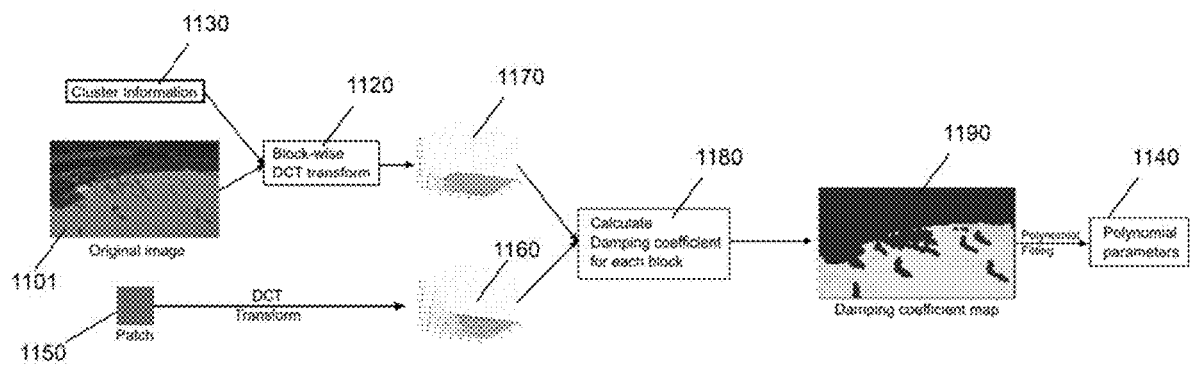
FIG. 11 is a schematic drawing illustrating processing for frequency adjustment of synthesizable regions in an image.

FIG. 11 shows the pipeline of the frequency adjustment method. In particular, original image (input image) 1101 and the cluster information 1130 (corresponding to the cluster information 1030, 930, and 830 referred to above) are input to block-wise DCT transformation 1120. The cluster information is used to determine which parts of the image belong to the textures region and thus, which parts of the image are to be processed by the frequency adjustment. In other words, the cluster information indicates which image blocks are to be DCT-transformed. The patch 1150 is also transformed by DCT transformation. The results of both transformations are represented in graphs 1170 and 1160. In particular, graph 1170 shows DCT coefficient values for a single block. On the other hand, graph 1160 shows the coefficient values calculated for the patch 1150. By comparing the coefficients of the patch with the coefficients of each of the blocks a damping coefficient for each block can be calculated 1180. The damping coefficient map 1190 resulting from such calculation is visualized in FIG. 11 for the input image 1101. The damping coefficient map is then approximated by a polynomial function and the corresponding polynomial parameters 1140 are signaled.

Figure 13:
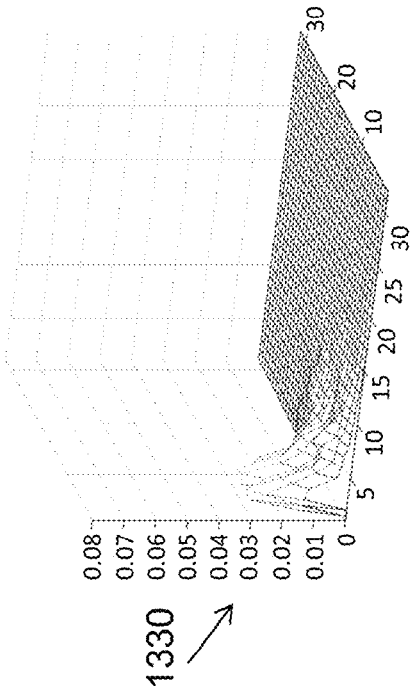
FIG. 13 is a schematic drawing illustrating processing results in different stages of frequency adjustment processing.
Figure 13:
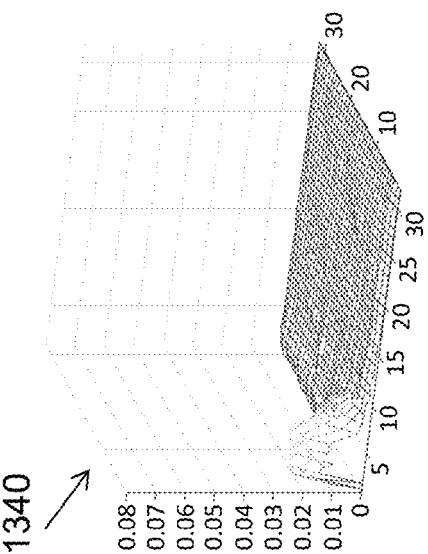
Figure 13:
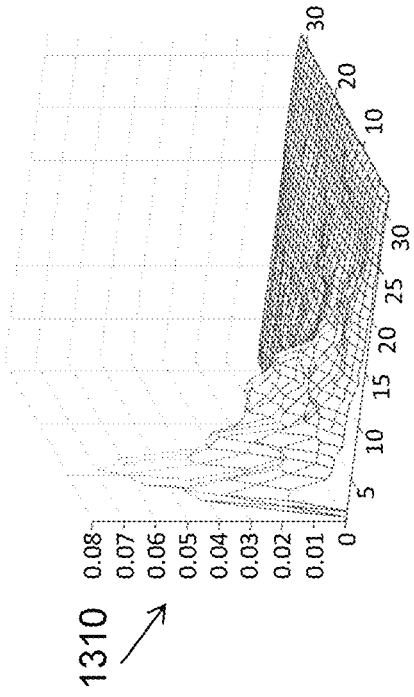

The calculation of the damping coefficient is further visualized in FIG. 13. In particular, a block-wise DCT-transform 1120 is calculated in the blocks of the synthesizable regions using the cluster information 830 (1130) from the previous clustering step 810 in order to determine the blocks belonging to the synthesizable regions. A result for one of the blocks is shown in FIG. 13 in the graph in the top right corner. In the graph, only AC coefficients, but not the DC coefficient (set to zero), are illustrated. The DCT-transform is also calculated on the extracted patch 850 (1150) from the patch extraction step 820.

The result of this DCT transformation is illustrated in FIG. 13 in the top left corner, in which the graph shows AC DCT coefficients 1310 of the patch but not the DC coefficient which is set to zero.

Between these DCT-transforms a damping coefficient is calculated for the damping function as explained above. The bottom left corner of FIG. 13 shows the resulting function 1320 parametrized with the damping coefficient calculated for the block of which the coefficients are listed in the top right corner of FIG. 13. The damping function 1320 is to be applied at the decoder to the patch in spectral domain 1310 in coefficient-wise manner to obtain an approximation of the coefficients 1330 of the original block, i.e. the damped coefficients of the patch. The resulting damped coefficients 1340 are illustrated in FIG. 13 in the bottom right corner. As can be seen in FIG. 13, the damped coefficients 1340 are much closer to the coefficients of the original block 1330 than the patch coefficients 1310.

As also described above, the damping function for one block has advantageously only a single parameter d. The parameter d for all blocks of the textured region gives the damping parameter map 1190. Fitting a polynomial on the parameters in the damping parameter map gives polynomial parameters which may be then signaled. The fitting may be performed similarly as for the luminance adjustment, i.e. with a linear or quadratic, or higher polynomials.

Correspondingly to the encoder operation, a decoder is provided for decoding a video frame employing a texture synthesis, the apparatus comprising a processing circuitry configured to: decode from the bitstream a texture patch and a first set of parameters; reconstruct a texture region within a video frame from the texture patch, the region including a plurality of image samples, the reconstruction including weighting spectral coefficients of the patch with a function defined by the first set of parameters.

In particular, according to an embodiment the processing circuitry at the decoder is configured to determine damping parameters (P) for the respective blocks of the texture region according to the first function (DF) defined by the first set of parameters (DP); reconstruct the blocks including applying the respective damping parameters (P) to the texture patch in spectral domain; and transform the reconstructed blocks from the spectral domain to spatial domain.

Block Artifact Avoidance

If a border between synthesized and non-synthesized blocks is still visible this border may be advantageously camouflaged by applying a mincut-algorithm. Several mincut-algorithms are applicable. For example, by overlapping a non-synthesized block with a synthesized block, the Euclidean distance of the luminance values is calculated. A shortest path through the distance matrix is found, for instance, by applying the Dijkstra-algorithm published in Edsger W. Dijkstra: *A note on two problems in connexion with graphs. In: Numerische Mathematik.* 1, 1959, S. 269-271.

In other words, the processing circuitry implementing the texture decoding (reconstruction) may apply suppression of block artifacts between blocks of the texture region and blocks of the remaining region, the suppression being performed by:

(i) calculating a distance matrix between luminance values of overlapped block of the texture region and block of the remaining region, (ii) calculating the shortest path in the distance matrix, (iii) combining the block of the texture region and the block of the remaining region along to the calculated shortest path.

Alternatively, different deblocking techniques may be applied, such as deblocking filtering used in HEVC.

Signaling

Figure 14:
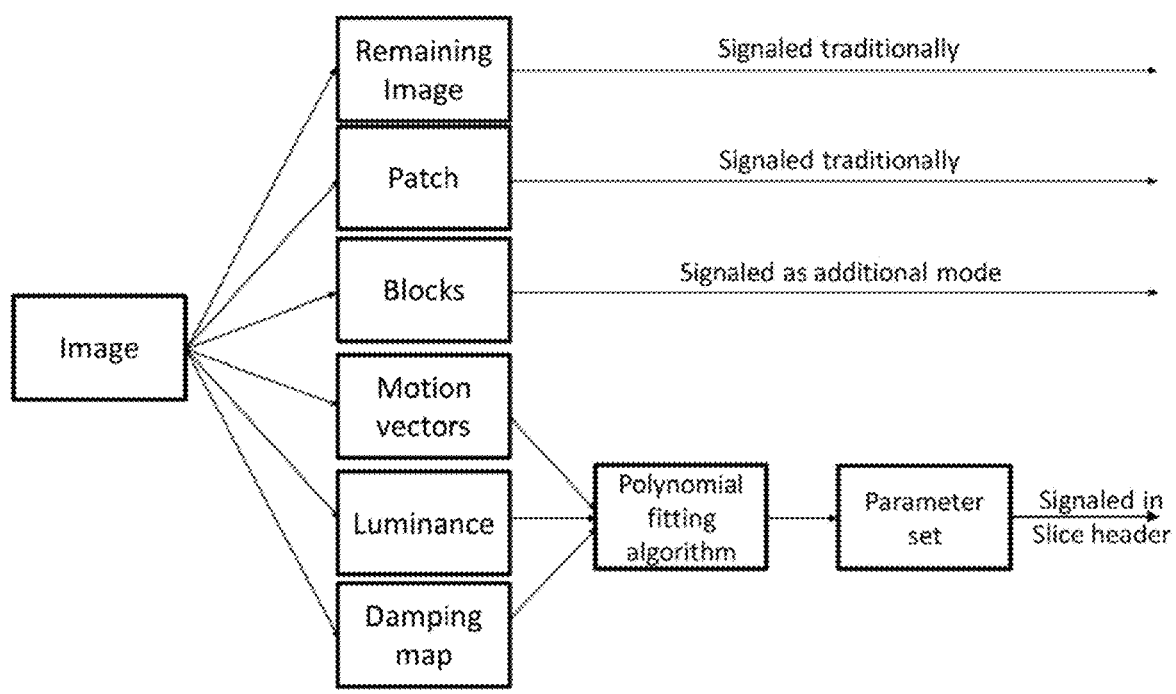
FIG. 14 is a schematic drawing illustrating signaling information generated at the encoder applying texture coding.

FIG. 14 illustrates an example of the control information generated at the encoder which may be transmitted to the decoder in order to enable correct decoding. In particular, the input image (video frame) is divided into texture region(s) and the remaining image. The remaining image is conventionally coded and the corresponding bitstream provided to the decoder. Each texture region (one or more) is then described by a patch, a block map and a set of adjustment parameters. In particular, a patch representing the text region is extracted from the text region and signaled in a bitstream to the decoder. Blocks or regions (or, in general, samples) pertaining to the texture region are identified and signaled to the decoder. The set of adjustment parameters may include one or more of the following: motion adjustment parameters, luminance adjustment parameters and frequency adjustment parameters. They may be signaled in the respective slice headers or picture parameter sets.

Figure 15:
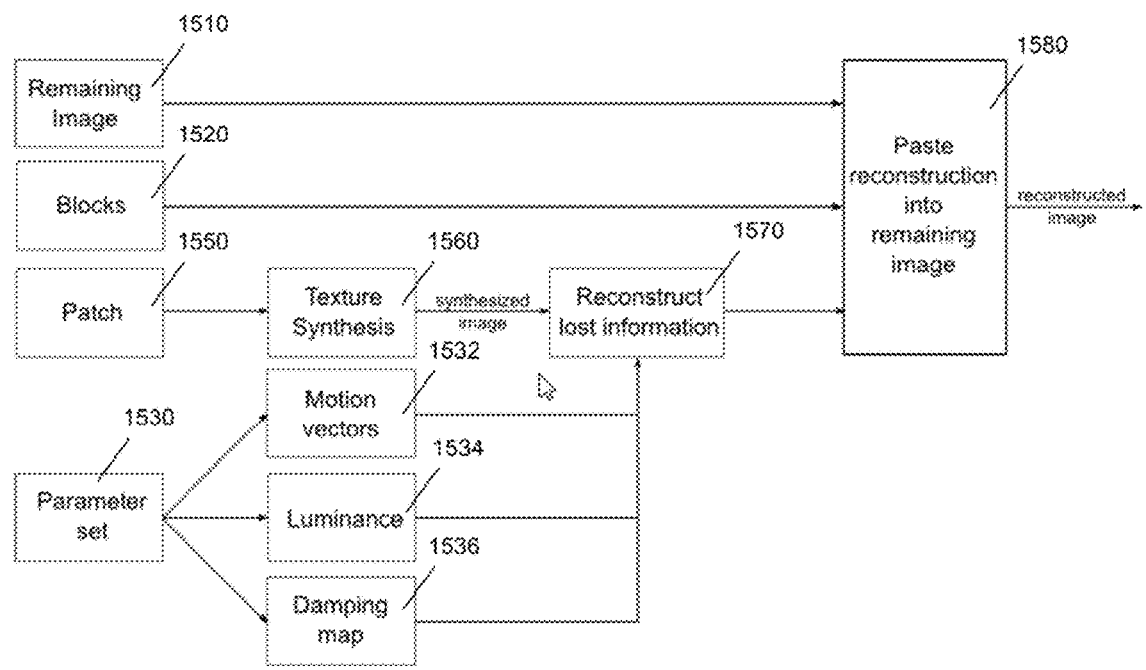
FIG. 15 is a schematic drawing illustrating signaling information utilized at the decoder applying texture decoding.

FIG. 15 illustrates the corresponding decoder operation. The remaining image portion 1510 is decoded conventionally and combined 1580 with a reconstructed 1570 texture on the blackened portions 1520 of the conventionally decoded image 1510. The texture is synthesized 1560 by copying the patch 1550 to the image covering at least the texture region 1520 and by modifying 1570 the synthesized texture by at least one of motion, luminance and frequency adjustment according to the respective parametric functions given by the signaled motion 1532, luminance 1534 and frequency adjustment 1536 parameter sets 1530.

The coefficients of the polynomials for motion, luminance and frequency are floating-point variables in the above described exemplary implementation. The number of variables depends on the chosen representation. Considering that the low number of parameters per slice is not a heavy burden in terms of bit rate overhead, the floating-point value v with an integer value N and a M-bit shift (>>) to the right is straight-forwardly approximated:

$$v \approx \frac{N}{2^M} = N >> M$$

Another approximation is also conceivable. Those parameters can be signaled in the PPS, or VPS, or slice header, or as a supplemental enhancement information (SEI) message, etc. The patch can be signaled as still image in a separate bitstream or in the same bitstream. It is noted that the term bitstream in this disclosure may mean one single bitstream or several parallel bitstreams. Embodiments of the present invention are not limited by any particular syntax and semantics of the signaled information of its packetization.

In one implementation the synthesizable regions can be signaled as a separate mode for the current block. Another implementation replaces all pixels in the textured regions by a constant color while the synthesizable regions are signaled using a binary map. If multiple synthesizable regions are detected these can also be included in the map. This map can be compressed by common data compression algorithms, for instance gzip or entropy coding based methods.

Reconstruction in the Decoder

The decoder performs a patch-based texture synthesis, for instance, as known as Image Quilting from A. A. Efros and W. T. Freeman, "Image quilting for texture synthesis and transfer," in Proceedings of the 28th Annual Conference on Computer Graphics and Interactive Techniques, ser. SIGGRAPH '01, New York, N.Y., USA: ACM, 2001, pp. 341-346 or GraphCut Textures known from V. Kwatra, A. Schödl, I. Essa, G. Turk, and A. Bobick, "Graphcut textures: Image and video synthesis using graph cuts," ACM Transactions on Graphics, SIGGRAPH 2003, vol. 22, no. 3, pp. 277-286, July 2003. Other texture synthesis algorithms are conceivable. The synthesis algorithm returns an image slightly larger than the region that is reconstructed that is simply pasted to the blocks in synthesis-mode. This only needs to be done once for a sequence of images containing the same textured region. This ensures temporal coherence as well as keeping computational effort low. The surfaces corresponding to motion vector fields are reconstructed. The texture image is transformed according to them. Since the texture image consists of subsamples of the patch its luminance is homogeneous. Therefore, the mean luminance of the patch is subtracted from the reconstructed luminance surface. This mean luminance difference is added to the reconstructed area. Reconstruction of the frequency is performed by applying the reconstructed damping factor block-wise.

Figure 16:
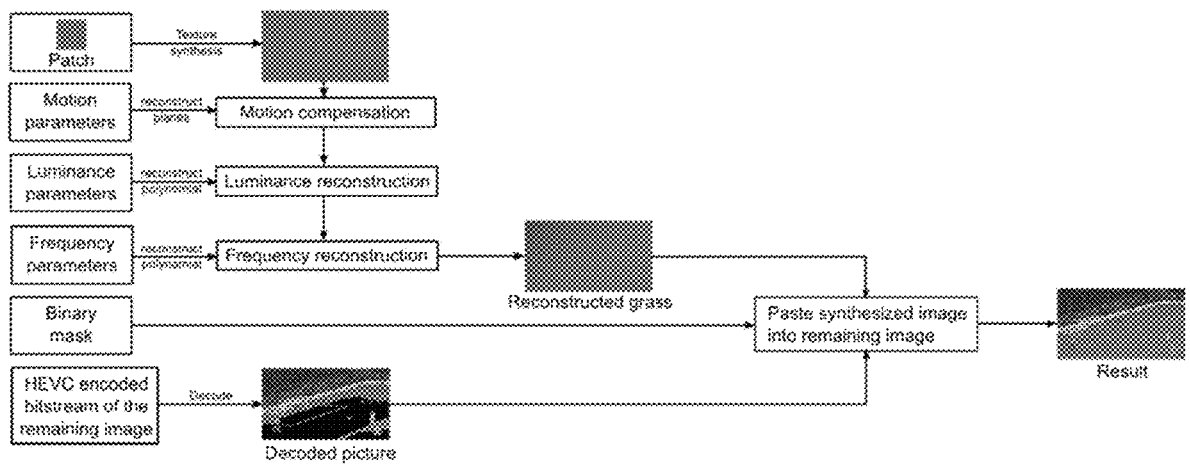
FIG. 16 is a schematic drawing of a pipeline for a combined HEVC and textured decoder.

FIG. 16 shows an exemplary decoder pipeline described above. Using the received informations on the left side of the figure the decoder performs the texture synthesis of the large texture image and sequentially performs the motion compensation, luminance reconstruction and frequency reconstruction to the large textured area. This large region is copied in the decoded picture at the regions given by the binary map.

In summary, according to an embodiment the present disclosure relates to an apparatus for encoding a video signal, wherein the video signal comprises a plurality of frames, each frame is dividable into a plurality of blocks, each block comprises a plurality of pixels, and each pixel is associated with at least one pixel value (also referred to as sample value). The encoding apparatus comprises a prediction module for intra prediction configured to generate a prediction block for a current, i.e. currently processed block on the basis of a reconstructed area comprising at least one already generated reconstructed block adjacent to the current block, wherein the prediction module is configured to implement the disclosed texture synthesis algorithm. A reconstructed block is a block reconstructed from a predicted block and an error block.

In one possible implementation the apparatus is configured to provide the encoded video signal in the form of a bit stream, wherein the bit stream comprises information about the disclosed signaling method for motion, luminance and frequency damping.

In other words, the encoder may perform the following processing:

Detect synthesizable regions in a picture and track them through a picture stream, Encode non-synthesizable regions in a conventional way, The synthesizable region is coded as an additional coding mode, or as an integer map coded by conventional encoders while replacing color information in the synthesizable blocks with a constant color, Extract one or more image patches from synthesizable regions, Extract motion information by employing the disclosed hyper plane fitting, Extract luminance information by employing the disclosed polynomial fitting, Extract frequency information by employing the disclosed polynomial fitting.

One or more of the above steps may be performed.

In other words, when simply replacing the synthesizable area with the patch, important information is lost. Based on the above provided embodiments, exemplary combined implementation has been tested applying:

Motion adjustment (x,y domain) using 1st order polynomial or higher (same for whole frame)

Luminance adjustment (x,y domain) using 1st order polynomial or higher (same for whole frame)

Frequency adjustment (frequency/DCT domain) using 1st/2nd order or higher (on block-level)

By fitting higher order polynomials to the information in the synthesizable area only a minor number of variables are sufficient to plausibly reconstruct this information. Experiments have shown that as few as 15 variables are sufficient. These variables can be signaled for example in the slice header.

According another embodiment, the present disclosure relates to a corresponding apparatus for decoding an encoded bit stream based on a video signal, wherein the video signal comprises a plurality of frames, each frame is dividable into a plurality of blocks, each block comprises a plurality of pixels, and each pixel is associated with at least one pixel value. The decoding apparatus comprises a prediction module for intra prediction configured to generate a prediction block for a current, i.e. currently processed block on the basis of a reconstructed area comprising at least one already generated reconstructed block adjacent to the current block, wherein the prediction module is configured to implement the disclosed texture synthesis algorithm.

In other words, the decoder may perform the following processing:

Decode non-synthesizable regions in a conventional way,

Reconstruct a region from one or multiple image patches,

Deform the reconstructed region to achieve visually plausible motion using hyper plane reconstruction from additionally signaled variables, Reconstruct luminance gradients using polynomial reconstruction from additionally signaled variables, Reconstruct frequencies in the textured region using polynomial reconstruction from additionally signaled variables, Deblock to avoid visible borders between synthesized and non-synthesized regions.

One or more of the above steps may be performed.

The present disclosure may be implemented in an apparatus and/or processing circuitry. Such apparatus may be a combination of a software and hardware or may be implemented only in hardware or only in software to be run on a computer or any kind of processing circuitry. For example, the texture synthesis and analysis may be implemented in a separate processing circuitry or in the same processing circuitry as the remaining texture encoding and decoding processing. The processing circuitry may be an integrated circuit. Moreover, the texture region encoding and decoding may be implemented in the same or different processing circuitry as the conventional video coder and decoder used to code and decode the remaining non-synthesizable image regions.

In other words, the processing described in the present disclosure may be performed by any processing circuitry such as one or more chips (e.g. integrated circuits), which may be a general purpose processor, or a digital signal processor (DSP), or a field programmable gate array (FPGA), or the like. However, embodiments of the present invention are not limited to implementation on a programmable hardware. They may be implemented on an application-specific integrated circuit (ASIC) or by a combination of the above mentioned hardware components.

Summarizing, present disclosure relates to encoding a decoding video employing texture coding. In particular, a texture region is identified within a video frame and a texture patch is determined for said region. Moreover, a first set of parameters is derived specifying weighting factors for reconstructing spectral coefficients of the texture region by fitting the texture region in spectral domain to a first function of the texture patch, the first function being defined by the first set of parameters. The texture patch and the first set of parameters are then included into a bitstream which is output of the encoder and provided in this way to the decoder which reconstructs the texture based on the patch and the function applied to the patch.

What is claimed is:

1. An apparatus for encoding a video picture employing a texture synthesis, the apparatus comprising:
processing circuitry configured to:
identify a texture region within the video picture and a texture patch for the identified texture region, wherein the identified texture region includes a plurality of picture samples;
determine a first set of parameters specifying weighting factors for reconstructing spectral coefficients of the identified texture region, including fitting the identified texture region in a spectral domain to a first function of the identified texture patch, the first function being determined according to the first set of parameters;
code the identified texture patch and the first set of parameters into a bitstream;
transform one or more blocks of the identified texture region into the spectral domain;
transform the identified texture patch into the spectral domain;
find, for the one or more transformed blocks, respective frequency damping parameters by approximating each respective transformed block with the transformed texture patch damped with the respective frequency damping parameter; and
code the first set of parameters by fitting the frequency damping parameters determined for the respective blocks to a block map function.

2. The apparatus according to claim 1, wherein the respective frequency damping parameter is a scalar value.

3. The apparatus according to claim 1, wherein the block map function is a first two-dimensional polynomial.

4. The apparatus according to claim 3, wherein the first two-dimensional polynomial has an order of one or two in each of two dimensions, the two dimensions being vertical and horizontal.

5. The apparatus according to claim 1, wherein the transformation for transforming the identified texture region and/or the identified texture patch into the spectral domain is a block-wise discrete cosine transformation.

6. The apparatus according to claim 1, the processing circuitry being further configured to:
determine a second set of parameters specifying luminance within the identified texture region by fitting the plurality of picture samples to a second two-dimensional function determined according to the second set of parameters; and code the second set of parameters into the bitstream.

7. The apparatus according to claim 1, the processing circuitry being further configured to:

estimate motion for the identified texture region;

generate motion information according to the estimated motion; and code the motion information into the bitstream.

8. The apparatus according to claim 7, wherein the processing circuitry is configured to perform the estimation of motion by calculating an optical flow between the identified texture region in the video picture and the identified texture region in a second video picture preceding the video picture, and wherein the motion information is a third set of parameters determined by fitting the optical flow to a two-dimensional polynomial of a first order or a second order.

9. The apparatus according to claim 8, wherein the calculation of the optical flow is performed by a function which penalizes higher distances between components of the optical flow and/or higher differences between corresponding samples of the video picture and the second video picture.

10. The apparatus according to claim 1, wherein the processing circuitry is further configured to apply a suppression of block artifacts between blocks of the identified texture region and blocks of a remaining region, the suppression being performed by:

(i) calculating a distance matrix between luminance values of a respective block of the identified texture region and an overlapped respective block of the remaining region, (ii) calculating a shortest path in the distance matrix, (iii) combining a respective block of the identified texture region and the respective block of the remaining region along the calculated shortest path.

11. The apparatus according to claim 1, wherein the processing circuitry is further configured to:

detect the identified texture region within a video picture using clustering, generate texture region information indicating the location of the texture region within the video picture, and insert the texture region information into the bitstream.

12. An apparatus for decoding a video picture employing a texture synthesis, the apparatus comprising:

processing circuitry configured to:

decode, from a bitstream, a texture patch and a first set of parameters;

reconstruct a texture region within a video picture from the texture patch, the texture region including a plurality of picture samples, wherein the reconstruction of the texture region includes weighting spectral coefficients of the texture patch with a first function determined according to the first set of parameters;

decode respective damping parameters for respective blocks of the texture region according to a block map function determined according to the first set of parameters;

reconstruct the respective blocks, wherein reconstructing the respective blocks includes applying the respective damping parameters to the texture patch in a spectral domain; and transform the reconstructed blocks from the spectral domain to a spatial domain.

13. The apparatus according to claim 12, the processing circuitry being further configured to:

decode a second set of parameters from the bitstream, wherein the reconstruction of the texture region further includes calculating a function of the texture patch luminance, the function of the texture patch luminance being defined by the parameters of the second set.

14. A method for encoding a video picture employing a texture synthesis, the method comprising:

identifying a texture region within a video picture and a texture patch of the identified texture region, the identified texture region including a plurality of picture samples;

determining a first set of parameters specifying weighting factors for reconstructing spectral coefficients of the identified texture region by fitting the identified texture region in a spectral domain to a first function of the identified texture patch, the first function being determined by the first set of parameters;

coding the identified texture patch and the first set of parameters into a bitstream;

transforming one or more blocks of the identified texture region into the spectral domain;

transforming the identified texture patch into the spectral domain;

calculating, for the one or more transformed blocks, respective frequency damping parameters by approximating each respective transformed block with the transformed texture patch damped with the respective frequency damping parameter; and coding the first set of parameters by fitting the frequency damping parameters determined for the respective blocks to a block map function.

15. A method for decoding a video picture employing a texture synthesis, the method comprising:

decoding, from the bitstream, a texture patch and a first set of parameters;

reconstructing a texture region within the video picture from the texture patch, the texture region including a plurality of picture samples, wherein the reconstructing the texture region includes weighting spectral coefficients of the texture patch with a function determined by the first set of parameters;

decoding respective damping parameters for respective blocks of the texture region according to a block map function determined according to the first set of parameters;

reconstructing the respective blocks, wherein reconstructing the respective blocks includes applying the respective damping parameters to the texture patch in a spectral domain; and transforming the reconstructed blocks from the spectral domain to the spatial domain.

* * * * *